United States Patent
Srinivasan et al.

(10) Patent No.: US 7,305,139 B2
(45) Date of Patent: Dec. 4, 2007

(54) REVERSIBLE 2-DIMENSIONAL PRE-/POST-FILTERING FOR LAPPED BIORTHOGONAL TRANSFORM

(75) Inventors: Sridhar Srinivasan, Redmond, WA (US); Chengjie Tu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 11/035,991

(22) Filed: Jan. 14, 2005

(65) Prior Publication Data

US 2006/0133684 A1 Jun. 22, 2006

Related U.S. Application Data

(63) Continuation-in-part of application No. 11/015,148, filed on Dec. 17, 2004.

(51) Int. Cl.
*G06K 9/36* (2006.01)
*G06K 9/46* (2006.01)

(52) U.S. Cl. .................................... 382/248

(58) Field of Classification Search ................ 382/162, 382/166, 173, 232, 233, 240, 248, 250, 276, 382/281, 289; 375/240.03, 240.18, 210.19
See application file for complete search history.

(56) References Cited

U.S. PATENT DOCUMENTS

| | | | |
|---|---|---|---|
| 4,754,492 A | 6/1988 | Malvar | |
| 5,297,236 A | 3/1994 | Antill et al. | |
| 5,311,310 A | 5/1994 | Jozawa et al. | |
| 5,384,849 A | 1/1995 | Jeong | |
| 5,805,739 A | 9/1998 | Malvar et al. | |
| 5,850,294 A | 12/1998 | Apostolopoulos et al. | |
| 5,859,788 A | 1/1999 | Sheng | |
| 5,933,522 A | 8/1999 | Kutka et al. | |
| 5,970,173 A | 10/1999 | Lee et al. | |
| 5,973,755 A | 10/1999 | Gabriel | |
| 5,982,459 A | 11/1999 | Fandrianto et al. | |
| 6,029,126 A | 2/2000 | Malvar | |
| 6,073,153 A | 6/2000 | Malvar | |
| 6,101,279 A * | 8/2000 | Nguyen et al. ............. 382/240 |
| 6,115,689 A | 9/2000 | Malvar | |
| 6,154,762 A | 11/2000 | Malvar | |

(Continued)

FOREIGN PATENT DOCUMENTS

AU 7351001 1/2002

(Continued)

OTHER PUBLICATIONS

U.S. Appl. No. 60/341,674, filed Dec. 2001, Lee et al.

(Continued)

*Primary Examiner*—Amir Alavi
(74) *Attorney, Agent, or Firm*—Klarquist Sparkman, LLP

(57) ABSTRACT

An efficient lapped transform useable in digital media codecs is realized using a reversible 2-dimensional overlap operator for pre/post filtering that is applied on a staggered grid relative to a core transform. The 2-dimensional lapped operator is based on a separably applied 1-dimensional reversible lapped operator, which is re-arranged as a sequence of elementary transforms in interleaved stages on subsets of points of the respective block and further implemented in lifting steps for computational efficiency. The interleaved stages include applying rotation and scaling stages between initial and final stages involving a normalized 2×2 Hadamard transform.

20 Claims, 25 Drawing Sheets

U.S. PATENT DOCUMENTS

| | | | |
|---|---|---|---|
| 6,253,165 | B1 | 6/2001 | Malvar |
| 6,307,887 | B1 | 10/2001 | Gabriel |
| 6,324,560 | B1 | 11/2001 | Malvar |
| 6,370,502 | B1 | 4/2002 | Wu et al. |
| 6,393,061 | B1 | 5/2002 | Owechko |
| 6,393,156 | B1 | 5/2002 | Nguyen et al. |
| 6,487,574 | B1 | 11/2002 | Malvar |
| 6,496,795 | B1 | 12/2002 | Malvar |
| 6,728,315 | B2 | 4/2004 | Haskell et al. |
| 6,728,316 | B2 | 4/2004 | Enficiaud et al. |
| 6,763,068 | B2 | 7/2004 | Oktem |
| 6,771,828 | B1 | 8/2004 | Malvar |
| 6,771,829 | B1 * | 8/2004 | Topiwala et al. ............ 382/240 |
| 6,865,229 | B1 | 3/2005 | Pronkine |
| 7,006,699 | B2 | 2/2006 | Malvar |
| 7,050,504 | B2 | 5/2006 | Joch et al. |
| 7,155,065 | B1 * | 12/2006 | Malvar ....................... 382/240 |
| 7,167,522 | B2 | 1/2007 | Webb |
| 2002/0118759 | A1 | 8/2002 | Enficiaud et al. |
| 2003/0128756 | A1 | 7/2003 | Oktem |
| 2003/0152146 | A1 | 8/2003 | Lin |
| 2003/0206582 | A1 | 11/2003 | Srinivasan |
| 2005/0013359 | A1 | 1/2005 | Srinivasan |
| 2006/0133684 | A1 * | 6/2006 | Srinivasan et al. ......... 382/250 |

FOREIGN PATENT DOCUMENTS

| | | |
|---|---|---|
| WO | WO 02/07438 | 1/2002 |

OTHER PUBLICATIONS

U.S. Appl. No. 60/488,710, filed Jul. 2003, Srinivasan et al.
Ahmed et al., "Discrete Cosine Transform," IEEE Transactions on Computers, C-23 (Jan. 1974), pp. 90-93.
Apostolopoulos et al., "Post-processing for very-low-bit-rate video compression," *IEEE Trans. Image Processing*, vol. 8, pp. 1125-1129, Aug. 1999.
Bhaskaran et al., "Image and Video Compression Standards Algorithms and Architectures," 2nd ed., 1997, pp. 192-194.
de Queiroz et al., "Lapped transforms for image compression," *The Handbook on Transforms and Data Compression*, edited by K. R. Rao and P. Yip, CRC Press, pp. 197-265, Oct. 2000.
de Queiroz et al., "Time-Varying Lapped Transforms and Wavelet Packets," *IEEE Transactions on Signal Processing*, vol. 41, No. 12, pp. 3293-3305 (1993).
Goel et al., "Pre-processing for MPEG Compression Using Adaptive Spatial Filtering," Proceedings of 1995 IEEE International Conference on Consumer Electronics, 1995, pp. 246-247.
"H.264 & IPTV Over DSL—Enabling New Telco Revenue Opportunities," *White Paper*, Intel/Envivio, May 15, 2004, available at http://www.envivio.com/images/products/H264whitepaper.pdf.
ISO/IEC JTC1/SC29/WG11 N4668, "Coding of Moving Pictures and Audio," Mar. 2002, Title: MPEG-4 Overview—(V.21—Jeju Version), Editor: Rob Koenen (rob.koenen@m4if.org), available at http://www.chiariglione.org/mpeg/standards/mpeg-4/mpeg-4.htm.
ISO/IEC, "ISO/IEC 11172-2: Information Technology—Coding of Moving Pictures and Associated Audio for Storage Media at up to About 1,5 Mbit/s," 122 pp. (1993).
ISO/IEC, "Information Technology—Coding of Audio-Visual Objects: Visual, ISO/IEC 14496-2, Committee Draft," 330 pp. (1998).
ITU-T, "ITU-T Recommendation H.261; Video Codec for Audio-visual Services at $p \times 64$ kbits," 28 pp. (1993).
ITU-T, "ITU-T Recommendation H.262: Information Technology—Generic Coding of Moving Pictures and Associated Audio Information: Videol," 218 pp. (1995).
ITU-T, "ITU-T Recommendation H.263: Video Coding for Low Bit Rate Communication," 167 pp. (1998).
Jain, "Fundamentals of Digital Image Processing," Chapters 2, 5, and 11, Prentice Hall, 189 pp. (1989).
Joint Video Team (JVT) of ISO/IEC MPEG & ITU-T VCEG, "Joint Final Committee Draft (JFCD) of Joint Video Specification," JVT-D157, 207 pp. (Aug. 2002).
Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).
Malvar, "Lapped Transforms for Efficient Transform/Subband Coding," *IEEE Transactions on Acoustics, Speech and Signal Processing*, vol. 38, No. 6, pp. 969-978 (1990).
Malvar, Signal Processing With Lapped Transforms, Norwood, MA: Artech House, pp. iv, vii-xi, 175-219, 264-273, and 353-357 (1992).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mook, "Next-Gen Windows Media Player Leaks to the Web," *BetaNews*, 17 pp. (Jul. 19, 2002) [Downloaded from the World Wide Web on Aug. 8, 2003].
Paeth, "A Fast Algorithm for General Raster Rotation," *Proceedings of Graphics Interface '86*, pp. 77-81, May 1986.
Park et al., "A post processing method for reducing quantization effects in low bit-rate moving picture coding," *IEEE Trans. Circuits Syst., Video Technol.*, vol. 9, pp. 161-171, Feb. 1999.
Printouts of FTP directories from http://ftp3.itu.ch , 8 pp. (downloaded from the World Wide Web on Sep. 20, 2005.).
Proposed SMPTE Standard for Television: VC-1 Compressed Video Bitstream Format and Decoding Process, pp. 1-500, (Aug. 2005).
Rao et al., "Techniques and Standards for Image, Video, and Audio Coding," Englewood Cliffs, NJ: Prentice-Hall (1996).
Reader, "History of MPEG Video Compression—Ver. 4.0," 99 pp., document marked Dec. 16, 2003.
Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).
Tanaka et al., "A Rotation Method for Raster Image Skew Transformation," *Proc IEEE Conf on Computer Vision and Pattern Recognition*, pp. 272-277, Jun. 1986.
Tran et al., "Lapped transform based video coding," *Proc. SPIE Applicat. Digital Image Processing XXIV*, San Diego, CA, pp. 319-333, Aug. 2001.
Tran et al., "Lapped Transform via Time-Domain Pre- and Post-Filtering," *IEEE Transactions on Signal Processing*, vol. 51, No. 6, pp. 1557-1571, Jun. 2003.
Tran, "Lapped Transform via Time-Domain Pre- and Post-Processing," 2001 Conference on Information Sciences and Systems, The Johns Hopkins University, Mar. 21-23, 2001.
Tu, "Context-Based Entropy Coding of Block Transform Coefficients for Image Compression," *IEEE Transactions On Image Processing*, vol. 11, No. 11, pp. 1271-1283, Nov. 2002.
Wien, "Variable Block-Size Transforms for Hybrid Video Coding," Dissertation, 182 pp. (Feb. 2004).

* cited by examiner

Vertical transform    Horizontal transform

Vertical   Horizontal    Vertical   Horizontal    Vertical   Horizontal
   Stage 1                  Stage 2                  Stage 3

Figure 22
2200
```
Hadamard22(PixelI & a, PixelI & b, PixelI & c,
PixelI & d)
{
    PixelI t1, t2;
    a += d;
    b -= c;
    t1 = (a - b) >> 1;
    t2 = c;
    c = t1 - d;
    d = t1 - t2;
    a -= d;
    b += c;
}
```
Figure 23
2300
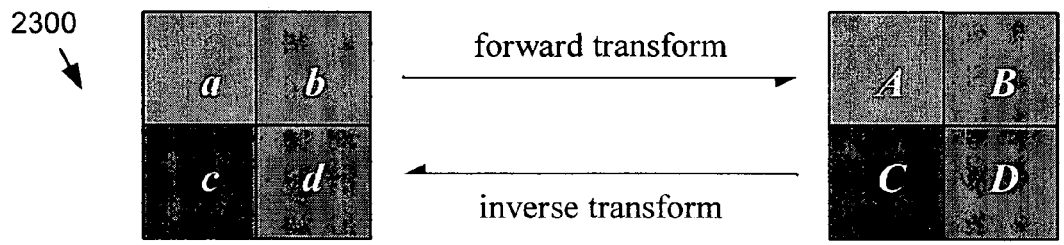
forward transform
inverse transform
Figure 24
2400
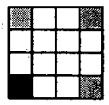 Step 1 – $\mathcal{T}_H$ applied to corners    2410
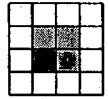 Step 2 – $\mathcal{T}_H$ applied to centers    2420
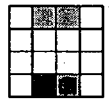 Step 3 – $\mathcal{T}_H$ applied to edges    2430
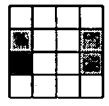 Step 4 – $\mathcal{T}_H$ applied to edges    2440

```
fwdOddOddPre(PixelI &a, PixelI &b, PixelI &c,
PixelI &d)
{
  d += a;
  c -= b;
  a -= (t1 = d >> 1);
  b += (t2 = c >> 1);

```
invOddOddPost(PixelI &a, PixelI &b, PixelI &c,
PixelI &d)
{
  d += a;
  c -= b;
  a -= (t1 = d >> 1);
  b += (t2 = c >> 1);

a -= (b * 3 + 6) >> 3;
  b += (a * 3 + 2) >> 2;
  a -= (b * 3 + 4) >> 3;

b -= t2;
  a += t1;
  c += b;
  d -= a;
}
```

Figure 27
2700
```
fwdRotatePre(PixelI &a, PixelI &b)
{
    b -= (a + 1) >> 1;
    a += (b + 1) >> 1;
}
```
Figure 28
2800
```
invRotatePost(PixelI &a, PixelI &b)
{
    a -= (b + 1) >> 1;
    b += (a + 1) >> 1;
}
```
Figure 29
2900
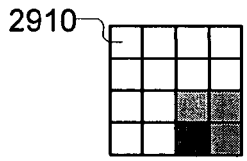
2910
Step 1 – high-high rotations            2920
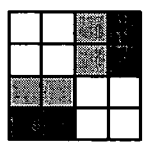
Step 2 – high-low/low-high 2 point      2930
rotations (4 sets)

Figure 30
3000
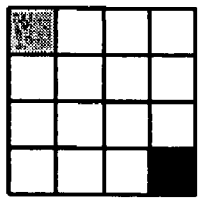
Step 1 – Scaling
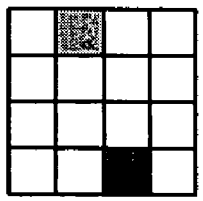
Step 2 – Scaling
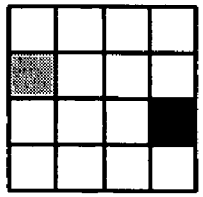
Step 3 – Scaling
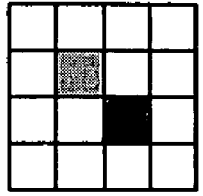
Step 4 – Scaling
Figure 31
3100
```
fwdScale(PixelI &a, PixelI &b)
{
    a += b;
    b -= (a + 1) >> 1;
    a += (*b * 3 + 4) >> 3;
    b += (*a * 3 + 8) >> 4;
    a += (*b * 3 + 0) >> 3;
    b += (a + 1) >> 1;
    a -= b;
}
```

```
invScale(PixelI &a, PixelI &b)
{
    a += b;
    b -= (a + 1) >> 1;

```
PLO44(PixelI &a, PixelI &b, PixelI &c, PixelI
&d, PixelI &e, PixelI &f, PixelI &g, PixelI &h,
PixelI &i, PixelI &j, PixelI &k, PixelI &l,
PixelI &m, PixelI &n, PixelI &o, PixelI &p)
{
    Hadamard22(a, d, m, p);
    Hadamard22(b, c, n, o);
    Hadamard22(e, h, i, l);
    Hadamard22(f, g, j, k);

fwdScale(a, p);
    fwdScale(b, l);
    fwdScale(e, o);
    fwdScale(f, k);

fwdRotatePre(n, m);
    fwdRotatePre(j, i);
    fwdRotatePre(h, d);
    fwdRotatePre(g, c);

fwdOddOddPre(k, l, o, p);

Hadamard22(a, m, d, p);
    Hadamard22(b, n, c, o);
    Hadamard22(e, i, h, l);
    Hadamard22(f, j, g, k);
}
```

```
IPLO44(PixelI &a, PixelI &b, PixelI &c, PixelI
&d, PixelI &e, PixelI &f, PixelI &g, PixelI &h,
PixelI &i, PixelI &j, PixelI &k, PixelI &l,
PixelI &m, PixelI &n, PixelI &o, PixelI &p)
{
    Hadamard22(a, m, d, p);
    Hadamard22(b, n, c, o);
    Hadamard22(e, i, h, l);
    Hadamard22(f, j, g, k);

invOddOddPost(k, l, o, p);

invRotatePost(n, m);
    invRotatePost (j, i);
    invRotatePost (h, d);
    invRotatePost (g, c);

invScale(a, p);
    invScale(b, l);
    invScale(e, o);
    invScale(f, k);

Hadamard22(a, d, m, p);
    Hadamard22(b, c, n, o);
    Hadamard22(e, h, i, l);
    Hadamard22(f, g, j, k);
}
```

```
fwdPreFilter22(PixelI &a, PixelI &b, PixelI &c,
PixelI &d)
{
    a += d;
    b += c;
    d -= (a + 1) >> 1;
    c -= (b + 1) >> 1;

```
invPostFilter2x2(PixelI &a, PixelI &b, PixelI
&c, PixelI &d)
{
    a += d;
    b += c;
    d -= (a + 1) >> 1;
    c -= (b + 1) >> 1;

```
PLO2(PixelI &a, PixelI &b)
{
    b -= (a + 4) >> 3;
    a -= (b + 2) >> 2;
    b -= (a + 4) >> 3;
}
```

```
IPLO2(PixelI &a, PixelI &b)
{
    b += (a + 4) >> 3;
    a += (b + 2) >> 2;
    b += (a + 4) >> 3;
}
```

```
PLO4(PixelI &a, PixelI &b, PixelI &c, PixelI &d)
{
    a -= (d * 3 + 16) >> 5;
    b -= (c * 3 + 16) >> 5;
    d -= (a * 3 + 8) >> 4;
    c -= (b * 3 + 8) >> 4;
    a += d - ((d * 3 + 16) >> 5);
    b += c - ((c * 3 + 16) >> 5);
    d -= (a + 1) >> 1;
    c -= (b + 1) >> 1;

fwdRotatePre(c, d);

```
IPL04(PixelI &a, PixelI &b, PixelI &c, PixelI
&d)
{
    b += c;
    a += d;
    c -= (b + 1) >> 1;
    d -= (a + 1) >> 1;

invRotatePost(c, d);

```
PCT44(PixelI & a, PixelI & b, PixelI & c, PixelI
& d, PixelI & e, PixelI & f, PixelI & g, PixelI
& h, PixelI & i, PixelI & j, PixelI & k, PixelI
& l, PixelI & m, PixelI & n, PixelI & o, PixelI
& p)
{
    Hadamard22(a, d, m, p);
    Hadamard22(b, n, c, o);
    Hadamard22(e, h, i, l);
    Hadamard22(f, g, j, k);

Hadamard22(a, b, e, f);

l = -l;
    o = -o;
    fwdOddOdd(k, l, o, p);

fwdOdd(h, g, d, c);

fwdOdd(n, j, m, i);
}
```

```
fwdOdd(PixelI &a, PixelI &b, PixelI &c, PixelI &d)
{
   b -= c;
   a += d;
   c += (b + 1) >> 1;
   d = ((a + 1) >> 1) - d;

/** rotate pi/8 **/
   b -= (3 * a + 4) >> 3;
   a += (3 * b + 4) >> 3;
   d -= (3 * c + 4) >> 3;
   c += (3 * d + 4) >> 3;

/** butterflies **/
   d += (b) >> 1;
   c -= (a + 1) >> 1;
   b -= d;
   a += c;
}
```

```
fwdOddOdd(PixelI &a, PixelI &b, PixelI &c, PixelI &d)
{
   d += a;
   c -= b;
   a -= (t1 = d >> 1);
   b += (t2 = c >> 1);

/** rotate pi/4 **/
   a += (b * 3 + 4) >> 3;
   b -= (a * 3 + 3) >> 2;
   a += (b * 3 + 3) >> 3;

```
IPCT44(PixelI & a, PixelI & b, PixelI & c,
PixelI & d, PixelI & e, PixelI & f, PixelI & g,
PixelI & h, PixelI & i, PixelI & j, PixelI & k,
PixelI & l, PixelI & m, PixelI & n, PixelI & o,
PixelI & p)
{
    invOdd(n, j, m, i);

invOdd(h, g, d, c);

invOddOdd(k, l, o, p);
    o = -o;
    l = -l;

Hadamard22(a, b, e, f);

Hadamard22(a, d, m, p);
     Hadamard22(b, n, c, o);
     Hadamard22(e, h, i, l);
     Hadamard22(f, g, j, k);
}
```

```
invOdd(PixelI &a, PixelI &b, PixelI &c, PixelI
&d)
{
  b += d;
  a -= c;
  d -= (b) >> 1;
  c += (a + 1) >> 1;

/** rotate pi/8 **/
  a -= (3 * b + 4) >> 3;
  b += (3 * a + 4) >> 3;
  c -= (3 * d + 4) >> 3;
  d += (3 * c + 4) >> 3;

/** butterflies **/
  c -= (b + 1) >> 1;
  d = ((a + 1) >> 1) - d;
  b += c;
  a -= d;
}
```

4600

```
invOddOdd(PixelI &a, PixelI &b, PixelI &c,
PixelI &d)
{
  d += a;
  c -= b;
  a -= (t1 = d >> 1);
  b += (t2 = c >> 1);

/** rotate pi/4 **/
  a - (b * 3 + 3 >> 3;
  b + (a * 3 + 3) >> 2;
  a - (b * 3 + 4 >> 3;

b -= t2;
  a += t1;
  c += b;
  d -= a;
}
```

Software 4780 Implementing Two
Dimensional Pre/Post-Filtering

REVERSIBLE 2-DIMENSIONAL PRE-/POST-FILTERING FOR LAPPED BIORTHOGONAL TRANSFORM

RELATED APPLICATION INFORMATION

This application is a continuation-in-part of Tu et al., U.S. patent application Ser. No. 11/015,148, entitled, "Reversible Overlap Operator For Efficient Lossless Data Compression," filed Dec. 17, 2004, which is hereby incorporated by reference.

TECHNICAL FIELD

The invention relates generally to digital media (e.g., video and image) compression using lapped transforms.

BACKGROUND

Lapped Transforms

The lapped transform is a powerful signal processing technique that is used in data compression. See, e.g., H. S. Malvar, *Signal Processing with Lapped Transforms*. Boston, Mass.: Artech House, 1992. However, to date, efficient lapped transforms with linear phase have neither been formulated nor been applied for lossless (reversible) compression of data.

As discussed in more detail below, it is known that a lapped transform can be formulated as a pre filter followed by a data transform (and its inverse as the inverse data transform followed by a post filter). See, e.g., H. S. Malvar, "A pre- and post-filtering technique for the reduction of blocking effects," in *Proc. Picture Coding Symposium*, Stockholm, Sweden, June 1987; and T. D. Tran, J. Liang, and C. Tu, "Lapped Transform via Time-Domain Pre- and Post-Filtering", *IEEE Trans. on Signal Processing*, vol. 51, no. 6, June 2003. A lossless data transform can be used in this formulation to achieve a good measure of reversibility. So far, it was believed that only a certain restricted variety of pre and post filters could be chosen for reversibility. This restricted set is very limited in its compression (rate vs. distortion, or R-D) performance. In a recent article (W. Dai and T. Tran, "Regularity-constrained pre- and post-filtering for block DCT-based systems," *IEEE Trans. on Signal Processing*, vol. 51, pp. 2568-2581, October 2003), a construction in which most elements are reversible and which has good compression properties was presented.

In audio compression, several constructions for reversible lapped transforms were introduced. See, e.g., R. Geiger, J. Herre, J. Koller, and K. Brandenburg, "IntMDCT—A link between perceptual and lossless audio coding," in *Proc. IEEE Int. Conf. on Acoustics, Speech, and Signal Processing*, Orlando, Fla., May 2002; and J. Li, "Reversible FFT And MDCT Via Matrix Lifting." in *Proc. IEEE Int. Conf. on Acoustics, Speech, and Signal Processing*, Montreal, Canada, May 2004. However, these constructions are applicable only to the modulated lapped transform (MLT), also known as modified discrete cosine transform (MDCT), whose basis functions are orthogonal and are not symmetric (that is, the basis functions are not linear phase). These transforms are not applicable to data compression applications where linear phase (symmetric) functions are required, such as in digital picture compression.

For picture (image) compression, one of the best-performing transforms in terms of R-D performance is the lapped biorthogonal transform (LBT). See, H. S. Malvar, "Biorthogonal And Nonuniform Lapped Transforms For Transform Coding With Reduced Blocking And Ringing Artifacts," *IEEE Trans. on Signal Processing*, vol. 46, pp. 1043-1053, April 1998. Unlike the MLT, the LBT basis functions are symmetric, and are not exactly orthogonal (in the LBT, the analysis basis functions are orthogonal to the synthesis basis functions, hence the term biorthogonal). LBTs have been successfully used in image compression applications, but they have not yet been used in lossless image compression, because integer-reversible constructions were not known.

Overview of Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks $(X_1, \ldots X_n)$, each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=M x, M being the transform matrix. When the input data is arbitrarily long, it is segmented into N sized vectors and a block transform is applied to each segment. For the purpose of data compression, reversible block transforms are chosen. In other words, the matrix M is invertible.

In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks. The DCT is described by N. Ahmed, T. Natarajan, and K. R. Rao, "Discrete Cosine Transform," *IEEE Transactions on Computers*, C-23 (January 1974), pp. 90-93. An exemplary implementation of the IDCT is described in "IEEE Standard Specification for the Implementations of 8×8 Inverse Discrete Cosine Transform," *IEEE Std.* 1180-1990, Dec. 6, 1990.

While compressing a still image (or an intra coded frame in a video sequence), most common standards such as MPEG-2, MPEG-4 and Windows Media partition the image into square tiles and apply a block transform to each image tile. The transform coefficients in a given partition (commonly known as block) are influenced only by the raw data components within the block. Irreversible or lossy operations on the encoder side such as quantization cause artifacts to appear in the decoded image. These artifacts are independent across blocks and produce a visually annoying effect known as the blocking effect. Likewise for audio data, when non-overlapping blocks are independently transform coded, quantization errors will produce discontinuities in the signal at the block boundaries upon reconstruction of the audio signal at the decoder. For audio, a periodic clicking effect is heard.

Several techniques are used to combat the blocking effect—the most popular among these are the deblocking filter that smoothes inter block edge boundaries, and spatial extrapolation that encodes differences between the raw input data and a prediction from neighboring block edges. These techniques are not without their flaws. For instance, the deblocking filter approach is "open loop", i.e. the forward transform process does not take into account the fact that deblocking is going to be performed prior to reconstruction on the decoder side. Besides, both these techniques are computationally expensive.

In order to minimize the blocking effect, cross block correlations can be exploited. One way of achieving cross block correlation is by using a lapped transform as described in H. Malvar, "Signal Processing with Lapped Transforms," Artech House, Norwood Mass., 1992. A lapped transform is a transform whose input spans, besides the data elements in the current block, a few adjacent elements in neighboring blocks. Likewise, on the reconstruction side the inverse transform influences all data points in the current block as well as a few data points in neighboring blocks.

For the case of 2-dimensional (2D) data, the lapped 2D transform is a function of the current block, together with select elements of blocks to the left, top, right, bottom and possibly top-left, top-right, bottom-left and bottom-right. The number of data points in neighboring blocks that are used to compute the current transform is referred to as the overlap.

Overview of the Spatial Domain Lapped Transform

The lapped transform can be implemented in the transform domain, as a step that merges transform domain quantities after a conventional block transform. Else, it can be implemented in the spatial-domain by a pre-processing stage that is applied to pixels within the range of overlap. These two implementations are mathematically related and therefore equivalent.

FIG. 2 shows an example of a conventional spatial-domain lapped transform. In the example shown, the overlap is 2 pixels, and two pixels each from the two adjacent blocks shown are pre-processed in pre-processing stage 210. Two pre-processed outputs are sent to each of the blocks for block transform-based coding by codec 100 as in FIG. 1. An inverse of the pre-processing stage is applied at post-processing stage 220 after decoding. With a judicious choice of pre-processing and block transform, a wide range of lapped transforms can be realized.

A key advantage of the spatial domain realization of the lapped transform is that an existing block transform-based codec can be retrofitted with a pre- and post-processing stage to derive the benefits of the lapped transform, i.e., reduced block effect and better compression, using an existing codec framework. Pre-processing 210 and post-processing can be represented as a matrix multiplication as shown in FIG. 3. Conventionally, the pre-processing and post-processing matrices are inverses of each other, i.e., pre-processing matrix ($P_f$) and the inverse or post-processing matrix ($P_i$) multiplied together equal the identity matrix I.

DEFINITIONS

In general, the length N of a transform is the number of transform coefficients in a certain transform block.

The support K of a transform is the number of input data points that influence coefficients of the transform block. Likewise, it is the number of output data points that are influenced by each transform coefficient, by the process of inverse transformation.

For typical block transforms such as the discrete cosine transform (DCT), the length and support are identical. However, lapped transforms (LTs) are an important class of transforms for which the support K is greater than the length N. The notation K×N is used to denote the support and length of a lapped transform. (Transforms for which K<N are expansive and therefore not used in data compression)

As an example 300, a 6×4 LT 310 shown in FIG. 3 is a transform with six inputs and four outputs. Since the transform is invertible, two of the inputs are shared with adjacent transform blocks. The inverse lapped transform (ILT) 320 produces six outputs from its four inputs. Output data points near the block boundary (in this case one point at each end of the block) are reconstructed by summing the corresponding responses of two adjacent inverse transform blocks.

Constraints on Lapped Transforms Used in Compression Systems

In the mathematical sense, lapped transforms are invertible structures, when we consider the input and output signals, as well as intermediate computation results, as real numbers. If infinite precision could be achieved, the input data could be perfectly recovered from its lapped transform coefficients. However, infinite precision is not possible in practice; for lossless compression of data, the requirement is to design a transform that operates on integer or fixed-precision arithmetic, yet perfectly reconstructs the data given the integer representation of transform coefficients. This is a stronger condition than mathematical invertibility, and such a transform is referred to here as a "lossless" transform. Moreover, it is required that the lossless transform be efficient for data compression (both lossless and lossy) as well. That efficiency can be measured by the entropy of the transformed data; the lower that entropy, the more the transformed data can be compressed by standard entropy coding techniques, such as context-based arithmetic coding or adaptive run-length coding.

SUMMARY

Various Realizations are described herein of an efficient lapped transform that is reversible in integer arithmetic, and can be used as the basis of an efficient and lossless data compression/decompression system.

It can be shown that the most efficient lossless transform designs (that is, those with minimum entropy of the transformed data) require the transform matrix be unit determinant (i.e., the determinant of the transform matrix is ±1). In the following description, it is assumed that the transform can be represented as a matrix multiplication, although it is recognized that there may be minor nonlinear phenomena such as data rounding. Thus, when we refer to the determinant, truncation or rounding aspects are not considered.

The efficient lapped transform is realized using pre- and post-filters that are referred to herein as "overlap operators". This realization is reversible, yet very R-D efficient. Among other applications, these new overlap operators allow the implementation of reversible LBTs, which can be used for lossless image compression. The pre- and post-filters use reversible operations. Further, the described overlap operators include simplifications for computational efficiency.

One realization of the pre and post filtering operation uses a 1-dimensional reversible overlap operator that is structured of unit determinant component matrices. More specifically, the reversible overlap operator is realized as a succession of planar rotational transforms and unit determinant planar scaling transforms. The planar scaling transforms can be implemented using planar shears or lifting steps. Further, the planar rotations and planar shears have an implementation as reversible/lossless operations, giving as a result, a reversible overlap operator.

An exemplary application is in an 8×4 one-dimensional lapped transform realized using computationally efficient approximations of the reversible overlap operators.

For a two dimensional lapped transform, this one-dimensional realization of the overlap operator can be applied separably to the horizontal rows of a block of digital media data, followed by applying the one-dimensional operator to the vertical columns of the data. This approach has several drawbacks, most severe of which are:

1. The difficulty/near-impossibility of obtaining a normalized pre/post filter for efficient data compression,
2. The high degree of complexity if such an approximation can be achieved, and
3. The inaccuracy due to multiple filtering/lifting steps when such an approximation is implemented.

An alternative implementation of the two-dimensional lapped transform described herein achieves better computational efficiency than the approach of separably horizontally and vertically applying the one-dimensional overlap operator. This alternative implementation separates the one-dimensional overlap operator into stages, and intersperses the stages of the horizontal and vertical application of the overlap operator. Within each stage, a normalized scaling operation implemented in lifting steps can be applied to more limited subsets of the data block (e.g., 2×2 subsets or signal pairs of a 4×4 data block) by noting cancellation of "cross terms" in the interspersed 2-dimensional structure. This results in an efficient scale-free reversible 2D pre/post filter.

The 2D pre/post filter can be combined with a reversible transform, such as the efficient scale-free reversible 2D block transform described by Srinivasan, U.S. patent application Ser. No. 11/015,707, entitled "Reversible Transform For Lossy And Lossless 2-D Data Compression," filed on Dec. 17, 2004 (the disclosure of which is hereby incorporated herein by reference). The combined pre/post filter and transform forms a lapped transform that may be used for effective and computationally efficient compression of images and video, both lossless and lossy.

Additional features and advantages of the invention will be made apparent from the following detailed description of embodiments that proceeds with reference to the accompanying drawings.

BRIEF DESCRIPTION OF THE DRAWINGS

FIG. 22 is a program listing in the C programming language for realizing a normalized 2×2 Hadamard operator that forms part of the two-dimensional pre/post-filter of FIG. 21.

FIG. 23 is a diagram showing the correspondence between data points processed with the 2×2 pre/post-filter.

FIG. 24 is a diagram illustrating the data points of a 4×4 data block to which the 2×2 Hadamard operator is applied in a first stage of the implementation of the 4×4 two-dimensional pre/post-filter of FIG. 21.

FIG. 25 is a program listing in the C programming language for realizing a forward rotation that forms part of the two-dimensional pre-filter of FIG. 21.

FIG. 26 is a program listing in the C programming language for realizing an inverse rotation that forms part of the two-dimensional post-filter of FIG. 21.

FIG. 27 is a program listing in the C programming language for realizing a forward 2-point rotation that forms part of the two-dimensional pre-filter of FIG. 21.

FIG. 28 is a program listing in the C programming language for realizing an inverse 2-point rotation that forms part of the two-dimensional post-filter of FIG. 21.

FIG. 29 is a diagram illustrating the data points of a 4×4 data block to which the rotations of FIGS. 25-28 are applied in another stage of the implementation of the 4×4 two-dimensional pre/post-filter of FIG. 21.

FIG. 30 is a diagram illustrating the data points of a 4×4 data block to which 2-point scaling operations are applied in a further stage of the implementation of the 4×4 two-dimensional pre/post-filter of FIG. 21.

FIG. 31 is a program listing in the C programming language for realizing a forward scaling that forms part of the two-dimensional pre-filter of FIG. 21.

FIG. 32 is a program listing in the C programming language for realizing an inverse scaling that forms part of the two-dimensional post-filter of FIG. 21.

FIG. 33 is a program listing in the C programming language for realizing the two-dimensional 4×4 pre-filter of FIG. 21.

FIG. 34 is a program listing in the C programming language for realizing the two-dimensional 4×4 post-filter of FIG. 21.

FIG. 35 is a program listing in the C programming language for realizing the two-dimensional 2×2 pre-filter.

FIG. 36 is a program listing in the C programming language for realizing the two-dimensional 2×2 post-filter.

FIG. 37 is a program listing in the C programming language for realizing a one-dimensional 2-point pre-filter for applying at image edges having insufficient data points for the two-dimensional pre-filter of FIG. 35.

FIG. 38 is a program listing in the C programming language for realizing a one-dimensional 2-point post-filter for applying at image edges having insufficient data points for the two-dimensional pre-filter of FIG. 36.

FIG. 39 is a program listing in the C programming language for realizing a one-dimensional 4-point pre-filter for applying at image edges having insufficient data points for the two-dimensional pre-filter of FIG. 33.

FIG. 40 is a program listing in the C programming language for realizing a one-dimensional 4-point post-filter for applying at image edges having insufficient data points for the two-dimensional pre-filter of FIG. 34.

FIG. 41 is a program listing in the C programming language for realizing a forward transform used in combination with the pre-filter of FIG. 21 to effect a lapped transform in the encoder of FIG. 4.

FIG. 42 is a program listing in the C programming language for realizing a transform that forms part of the forward transform of FIG. 41.

FIG. 43 is a program listing in the C programming language for realizing another transform that forms part of the forward transform of FIG. 41.

FIG. 44 is a program listing in the C programming language for realizing an inverse transform used in combination with the post-filter of FIG. 21 to effect an inverse lapped transform in the decoder of FIG. 5.

FIG. 45 is a program listing in the C programming language for realizing a transform that forms part of the inverse transform of FIG. 44.

DETAILED DESCRIPTION

The following description relates to a digital media compression system or codec, which utilizes a reversible 2-dimensional pre-/post-filtering for a lapped transform. For purposes of illustration, an embodiment of a compression system incorporating this 2-dimensional pre-/post-filtering is an image or video compression system. Alternatively, the reversible overlap operator also can be incorporated into compression systems or codecs for other 2D data. The reversible overlap operator does not require that the digital media compression system encodes the compressed digital media data in a particular coding format.

1. Encoder/Decoder

Figure 4:
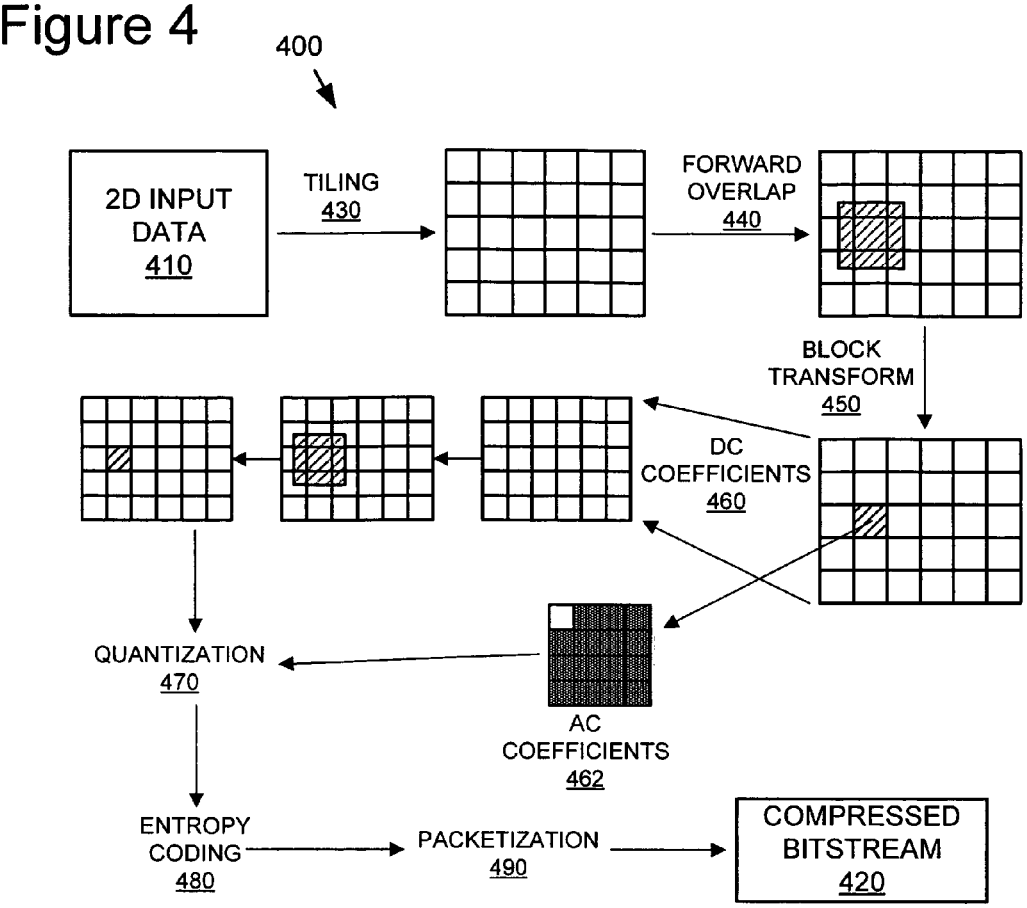
FIG. 4 is a flow diagram of an encoder based on a lapped transform utilizing a reversible overlap operator.
Figure 5:
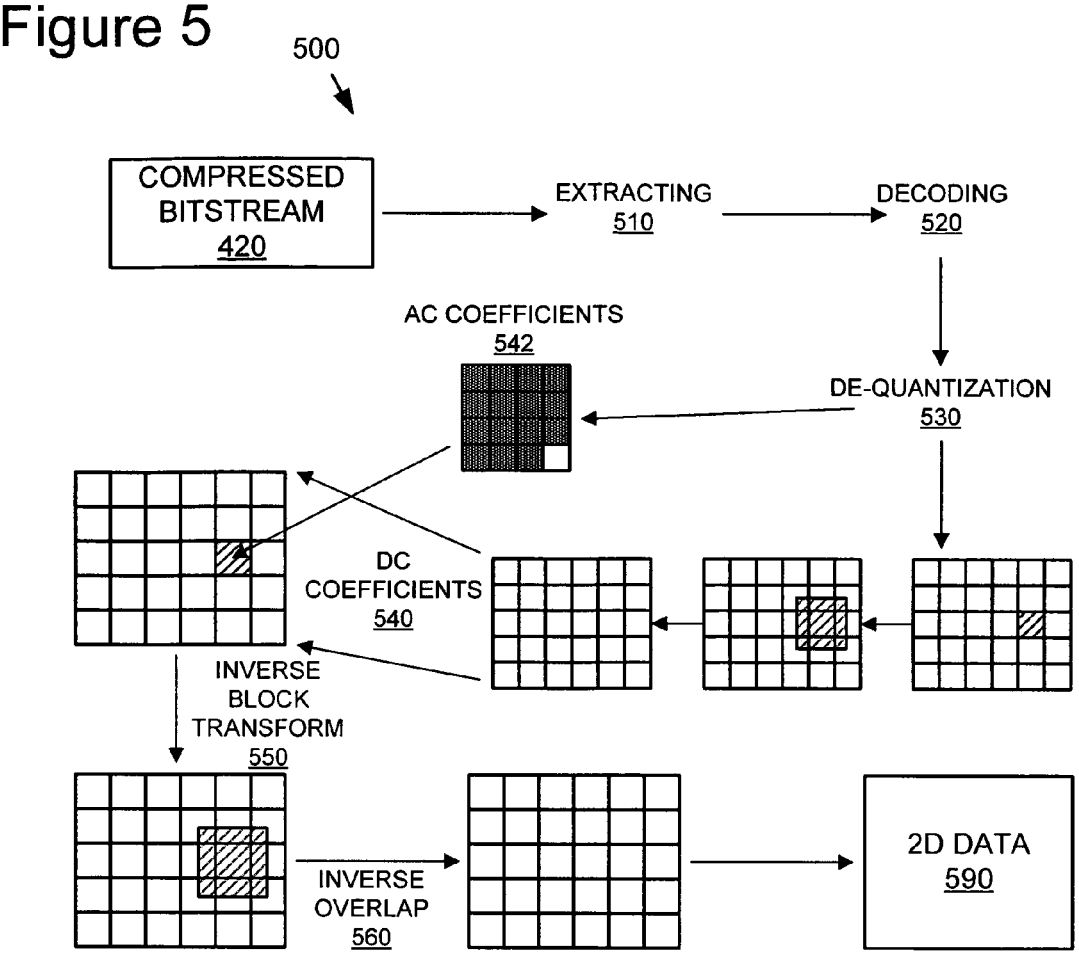
FIG. 5 is a flow diagram of a decoder based on the lapped transform.

FIGS. 4 and 5 are a generalized diagram of the processes employed in a representative 2-dimensional (2D) data encoder 400 and decoder 500 based on a lapped transform using the reversible overlap operator. The diagrams present a generalized or simplified illustration of the use and application of this reversible overlap operator in a compression system incorporating the 2D data encoder and decoder. In alternative encoders based on this reversible overlap operator, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 400 produces a compressed bitstream 420 that is a more compact representation (for typical input) of 2D data 410 presented as input to the encoder. For example, the 2D data input can be an image, a frame of a video sequence, or other data having two dimensions. The 2D data encoder tiles 430 the input data into macroblocks, which are 16×16 pixels in size in this representative encoder. The 2D data encoder further tiles each macroblock into 4×4 blocks 432. A "forward overlap" operator 440 is applied to each edge between blocks, after which each 4×4 block is transformed using a block transform 450. This block transform 450 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004, the disclosure of which is hereby incorporated by reference. Alternatively, the discrete cosine transform or other block transforms can be used with the reversible overlap operator described herein. Subsequent to the transform, the DC coefficient 460 of each 4×4 transform block is subject to a similar processing chain (tiling, forward overlap, followed by 4×4 block transform). The resulting DC transform coefficients and the AC transform coefficients are quantized 470, entropy coded 480 and packetized 490.

The decoder performs the reverse process. On the decoder side, the transform coefficient bits are extracted 510 from their respective packets, from which the coefficients are themselves decoded 520 and dequantized 530. The DC coefficients 540 are regenerated by applying an inverse transform, and the plane of DC coefficients is "inverse overlapped" using a suitable smoothing operator applied across the DC block edges. Subsequently, the entire data is regenerated by applying the 4×4 inverse transform 550 to the DC coefficients, and the AC coefficients 542 decoded from the bitstream. Finally, the block edges in the resulting image planes are inverse overlap filtered 560. This produces a reconstructed 2D data output.

In an exemplary implementation, the encoder 400 (FIG. 4) compresses an input image into the compressed bitstream 420 (e.g., a file), and the decoder 500 (FIG. 5) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 410 compressed by the illustrated encoder 400/decoder 500 can be images of various color formats (e.g., RGB/YUV4:4:4 or YUV4:2:0 color image formats). Typically, the input image always has a luminance (Y) component. If it is a RGB/YUV4:4:4 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 400 tiles the input image or picture into macroblocks. In an exemplary implementation, the encoder 400 tiles the input image into 16×16 macroblocks in the Y channel (which may be 16×16 or 8×8 areas in the U and V channels depending on the color format). Each macroblock color plane is tiled into 4×4 regions or blocks. Therefore, a macroblock is composed for the various color formats in the following manner for this exemplary encoder implementation:

1. For a grayscale image, each macroblock contains 16 4×4 luminance (Y) blocks.
2. For a YUV4:2:0 format color image, each macroblock contains 16 4×4 Y blocks, and 4 each 4×4 chrominance (U and V) blocks.
3. For a RGB or YUV4:4:4 color image, each macroblock contains 16 blocks each of Y, U and V channels.

2. Lapped Transform Realized Using Overlap Operators

Figure 1:
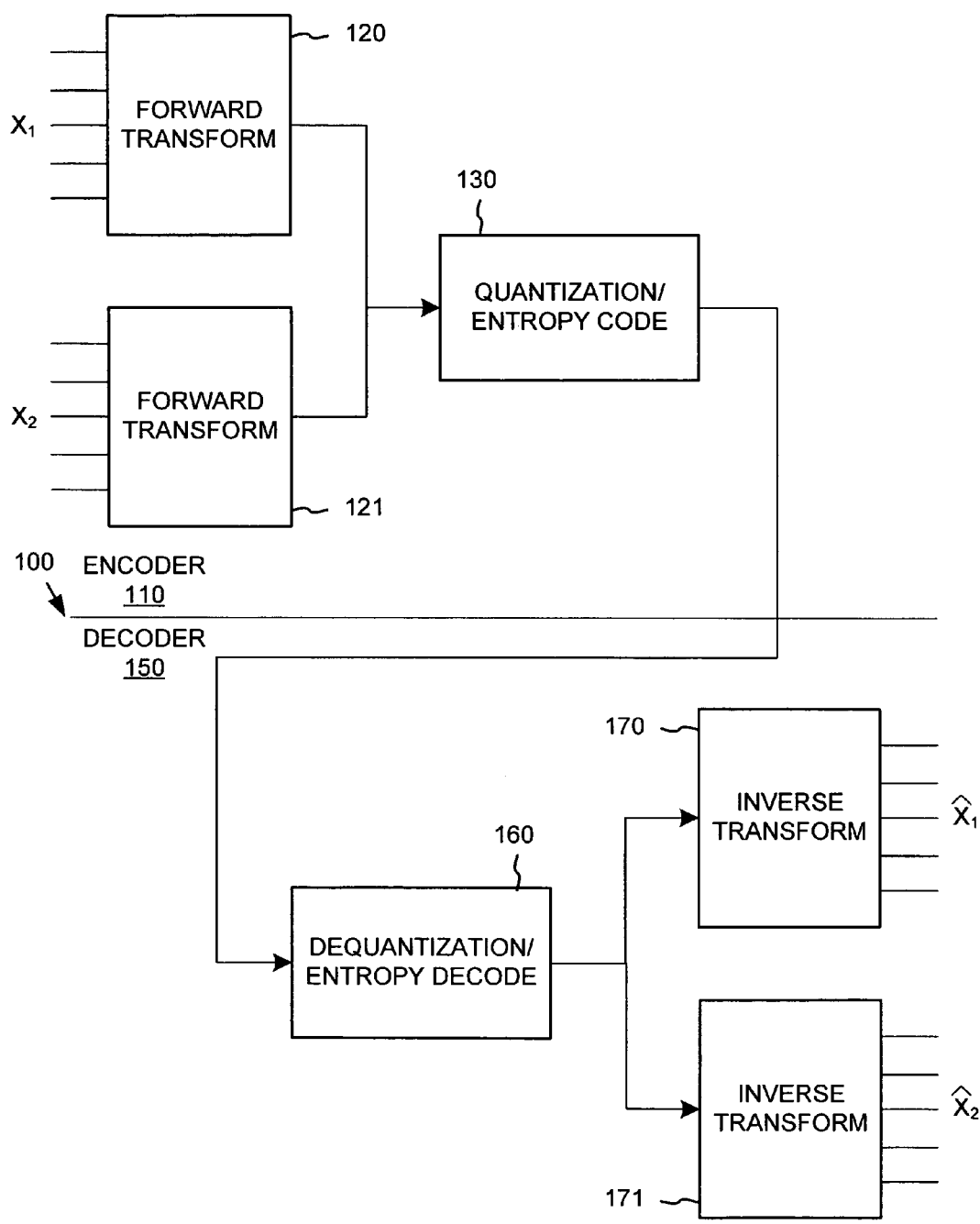
FIG. 1 is a block diagram of a conventional block transform-based codec in the prior art.
Figure 2:
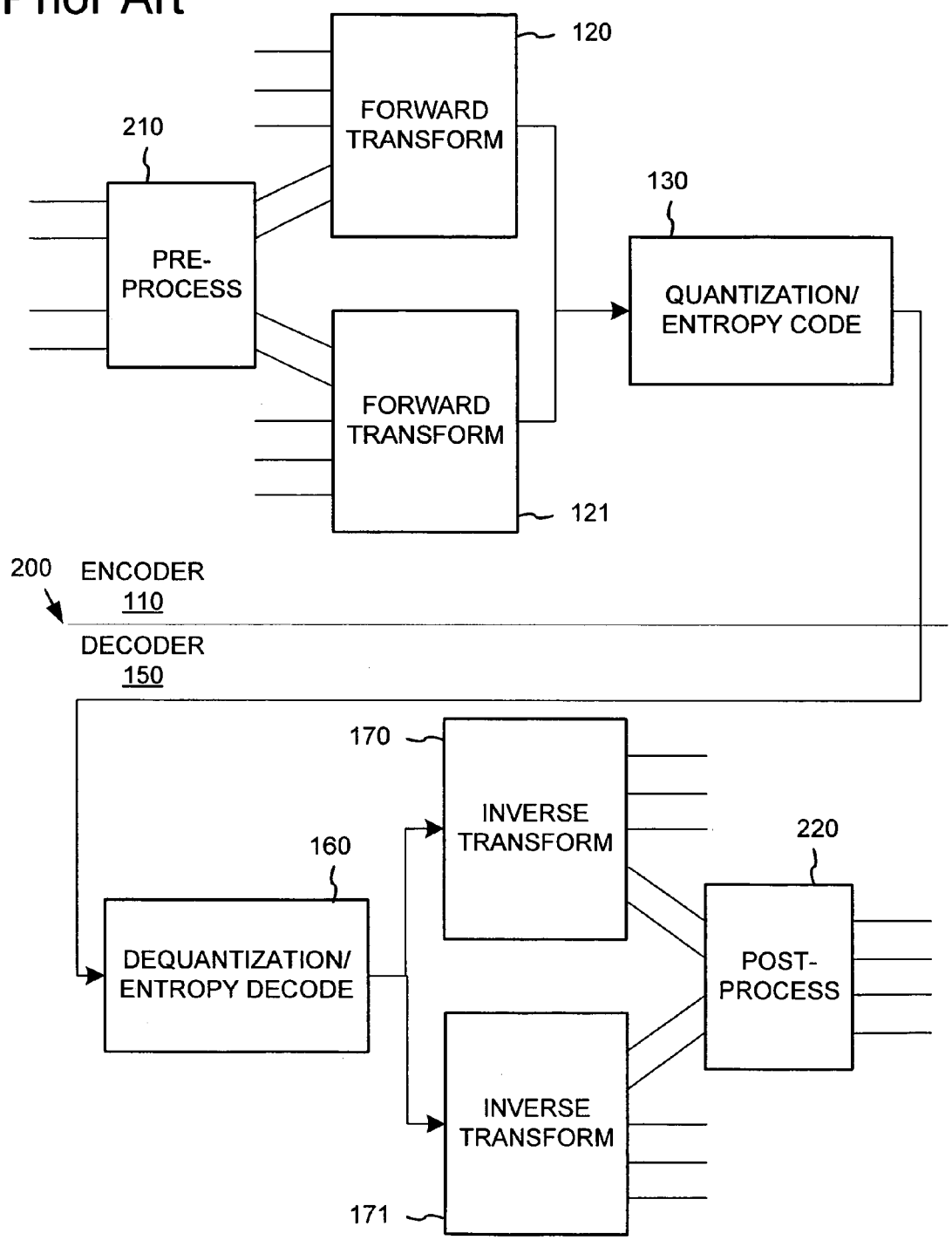
FIG. 2 is a block diagram of a spatial-domain lapped transform implemented as pre and post processing operations in combination with the block transform-based codec of FIG. 1, also in the prior art.
Figure 3:
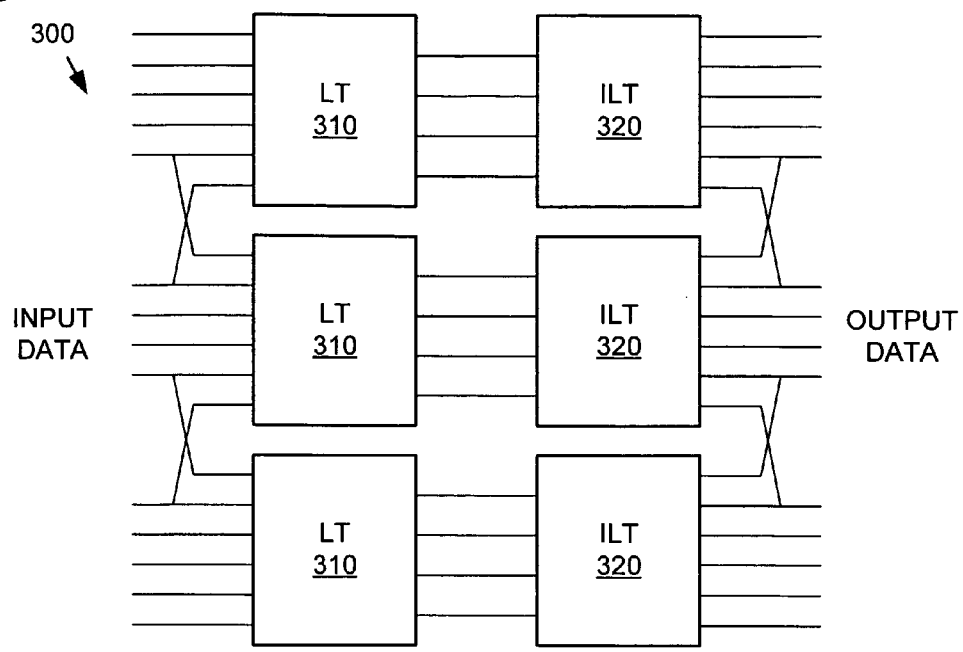
FIG. 3 is a block diagram illustrating a lapped transform and inverse lapped transform pair on 1-dimensional data.
Figure 6:
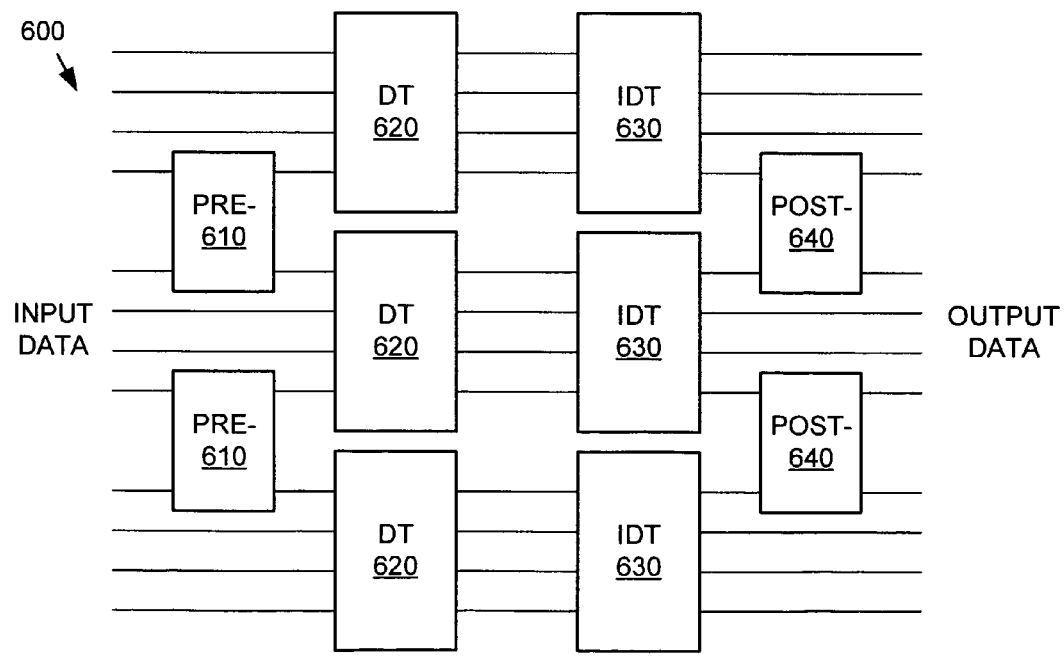
FIG. 6 is a block diagram illustrating a lapped transform and inverse lapped transform pair on 1-dimensional data using pre- and post-filtering operations (or reversible overlap operator) in conjunction with a block transform.

More generally, the overlap operator 440 and block transform 450 of the encoder 400 (FIG. 4) is an example of a large class of lapped transforms 600 that can be factorized into a pre filtering operation 610, followed by a block data transform 620 as illustrated in FIG. 6. FIG. 6 illustrates a generalized example of such factorized lapped transforms. In this illustrated case, the 6×4 lapped transform 310 shown in FIG. 3 is factorized into pre-filter operation 610 and block transform 620 stages. The pre filtering operation 610 and block transform 620 are evenly staggered over the data points. In this illustrated 6×4 lapped transform 600 example, each pre filter is a length 2 transformation of the data points straddling adjacent blocks. On the decode side, a post filter 640 is applied after the inverse block transform 630 across block boundaries. Likewise, for the general K×N case, the pre filter is applied to the (K−N)/2 data points of each block adjacent to a block boundary.

For invertibility, the pre-filter 610 and post filter 640 are inverses of each other. For realizing a lossless lapped transform, however, this condition is not sufficient. This further constrains the pre and post filters 610, 640 to be lossless transforms as well, in addition to the block (core) transform 620 to be realized in a lossless manner. The DCT can be realized in a lossless manner, using ladder, lattice-, or lifting-based methods, among others. See, e.g., A. A. M. L. Bruekens and A. W. M. van den Enden, "New networks for perfect inversion and perfect reconstruction", *IEEE J. Selected Areas Communications*, vol. 10, no. 1, 1992; and I. Daubechies and W. Sweldens, "Factoring wavelet transform into lifting steps", *J. Fourier Anal. Appl.*, vol. 4, pp. 247-269, 1998. A reversible, scale-free 2-dimensional transform also is described by Srinivasan, U.S. patent application Ser. No. 11/015,707, entitled, "Reversible Transform For Lossy And Lossless 2-D Data Compression," filed Dec. 17, 2004 and incorporated by reference herein. Lifting-based reversible approximations to the DCT in one dimension also are known. See, e.g., J. Liang and T. D. Tran, "Fast Multiplierless Approximations Of The DCT With The Lifting Scheme," *IEEE Trans. Signal Processing*, vol. 49, pp. 3032-3044, December 2001.

Efficient reversibility further requires that both steps, viz. the pre/post filter and the block transform, be unit determinant.

3. Reversible Overlap Operator

Figure 7:
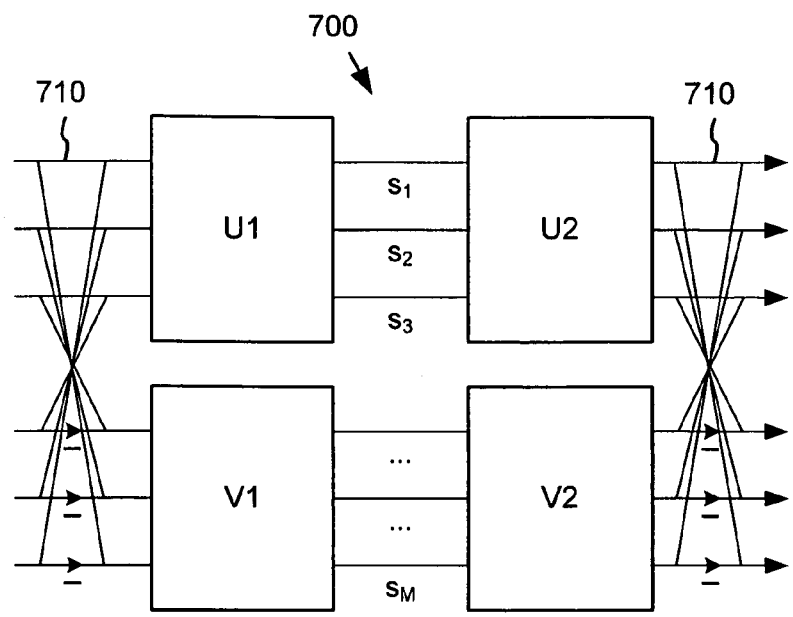
FIG. 7 is a signal flow graph illustrating a structure of a linear phase pre- (or post-) filter for use as the reversible overlap operator in the lapped transform of FIG. 6.

An efficient reversible overlap operator for use as the pre-filter 610 (FIG. 6) of the lossless lapped transform 600 on which the encoder 400/decoder 500 (FIGS. 4 and 5) is based can be realized as a linear phase pre-filter, which is factorized into the structure 700 shown in FIG. 7. An inverse of this pre-filter (i.e., the post-filter 640) also has the same structure but with different coefficients.

This linear phase filter structure 700 has multiple orthogonal components, including a cross-over Hadamard network 710 at its input and output. The internal arrows in the illustrated Hadamard network 710 denote negation in this diagram. The structure 700 further includes orthogonal matrices U1, U2, V1 and V2. These components can be implemented in a lossless manner by using lattice/lifting based methods.

In addition, the structure 700 has the nonzero scale factors $s_1$ through $s_M$. The unit determinant constraint implies that $$\prod_i s_i = \pm 1.$$

When all scale factors are ±1, the pre/post filters can be realized as a lossless transform where the component matrices U1, U2, V1 and V2 are implemented as lossless lattice/lifting steps. However, when scale factors are not all ±1, the lossless realization remains a challenge that is addressed as discussed more fully below.

With this linear phase pre-filter structure 700, the problem of realizing a lossless pre-/post-filter pair is reduced to the following three steps:

1. Decomposing the filter F into the following form, for orthogonal matrices U1, U2, V1 and V2:

$$F = \begin{pmatrix} 1 & J \\ J/2 & -1/2 \end{pmatrix} \begin{pmatrix} U_1 & 0 \\ 0 & V_1 \end{pmatrix} \begin{pmatrix} s_1 & & & \\ & s_2 & & \\ & & \ddots & \\ & & & s_M \end{pmatrix} \begin{pmatrix} U_2 & 0 \\ 0 & V_2 \end{pmatrix} \begin{pmatrix} 1/2 & J \\ J/2 & -I \end{pmatrix} \quad (1)$$

where I is the identity matrix and $$J = \begin{pmatrix} 0 & & 0 & 1 \\ 0 & & 1 & 0 \\ 0 & \cdots & & \\ 1 & & 0 & 0 \end{pmatrix};$$

2. Deriving lossless realizations for U1, U2, V1 and V2; and
3. Deriving a lossless realization for the scaling matrix.

As to step 1, the first and last matrices on the right hand side, which define 2 point Hadamard transforms, incorporate the factor of ½ in some terms to make these stages unit determinant. The rest is re-arranged to a block diagonal form with two blocks, each of half the linear dimensions of F. The singular value decomposition or SVD of each block provides the orthogonal matrices U1, U2, V1 and V2, as well as the scales.

The lossless realizations of the component matrices can be derived in Step 2 using standard lifting-based techniques, such as those described by A. A. M. L. Bruekens and A. W. M. van den Enden, "New networks for perfect inversion and perfect reconstruction", *IEEE J. Selected Areas Communications*, vol. 10, no. 1, 1992.

The lossless realization of the scaling matrix in Step 3 is addressed as follows. For simplicity, let us assume that we have a certain 2 input 2 output component that is (a) lossless and (b) realizes scaling by s (0<s<1) for the first component and by 1/s for the second component (other cases can be obtained by reverting the sign of one or both output signals). In other words, we have the input-output relationship given by $$y = \begin{pmatrix} s & 0 \\ 0 & 1/s \end{pmatrix} x \quad (2)$$

Figure 8:
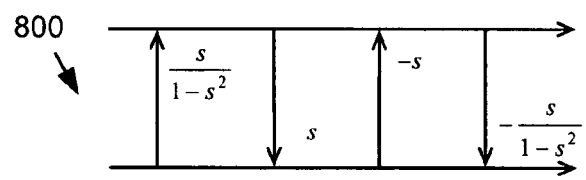
FIG. 8 is a signal flow graph of lossless scaling as four lifting steps for use in the reversible overlap operator.
Figure 9:
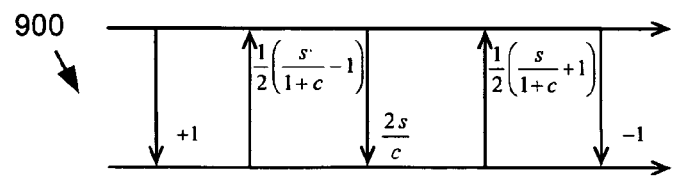
FIG. 9 is a signal flow graph of lossless scaling as five lifting steps for use in the reversible overlap operator.

The determinant of the transformation matrix in equation (2) is s/s=1. This matrix can be realized in four lifting steps procedure 800 or five lifting steps procedure 900 as shown in FIGS. 8 and 9. We usually approximate all the lifting steps in the form of y=(a.x+r)>>b, where x is the input and y is the output, and a, b, and r are integers and r is used for rounding error control, to get a division-less integer implementation. The transform defined by equation (2) is referred to here as the unit determinant scaling transform, abbreviated as the scaling transform.

Interestingly, the scaling transform is closely related with the shear operation, as defined below:

$$y = \begin{pmatrix} a & b \\ b & a \end{pmatrix} x \quad (3)$$

Under the constraint $a^2-b^2=1$ (a>0, b≧0), the shear operation has unit determinant and can be realized with three lifting steps:

$$\begin{pmatrix} a & b \\ b & a \end{pmatrix} = \begin{pmatrix} 1 & \sqrt{\frac{a-1}{a+1}} \\ 0 & 1 \end{pmatrix} \begin{pmatrix} 1 & 0 \\ b & 1 \end{pmatrix} \begin{pmatrix} 1 & \sqrt{\frac{a-1}{a+1}} \\ 0 & 1 \end{pmatrix}, \quad (4)$$

Therefore, $$\begin{bmatrix} a+b & 0 \\ 0 & a-b \end{bmatrix} = \begin{bmatrix} 1 & 1/2 \\ -1 & 1/2 \end{bmatrix} \begin{bmatrix} 1/2 & 0 \\ 0 & 1 \end{bmatrix} \begin{bmatrix} a & b \\ b & a \end{bmatrix} \begin{bmatrix} 2 & 0 \\ 0 & 1 \end{bmatrix} \quad (5)$$

$$\begin{bmatrix} 1/2 & -1/2 \\ 1 & 1 \end{bmatrix} = \begin{bmatrix} 1 & 0 \\ -1 & 1 \end{bmatrix} \begin{bmatrix} 1 & \frac{1}{2}\left(\sqrt{\frac{a-1}{a+1}}+1\right) \\ 0 & 1 \end{bmatrix} \begin{bmatrix} 1 & 0 \\ 2b & 1 \end{bmatrix}$$

-continued $$\begin{bmatrix} 1 & \frac{1}{2}\left(\sqrt{\frac{a-1}{a+1}}+1\right) \\ 0 & 1 \end{bmatrix} \begin{bmatrix} 1 & 0 \\ 1 & 1 \end{bmatrix}$$

Here the scaling factors ½ and 2 in the matrices sandwiching the shear matrix are distributed to the shear lifting steps, and the last lifting step of the first matrix is combined with the first shear lifting step while the first lifting step of the last matrix is combined with the first shear lifting step. The five step realization as procedure 900 of the scaling transform shown in FIG. 9 is based on equation (5). Simplifications to the structure may be possible by canceling inverse operations, where possible, between the 3 groups in equation (1), viz the Hadamard networks, the orthogonal matrices, and the scaling operations (which may in turn be decomposed into Hadamard and shear operations).

More particularly, the effective transform matrix of the four lifting step realization of lossless scaling as procedure 800 is $$T = \begin{pmatrix} c^{-2} & 0 \\ 0 & c^2 \end{pmatrix},$$

where $c^2=1-s^2$. On the other hand, the effective transform matrix of the five lifting step realization in procedure 900 is $$T = \begin{pmatrix} \frac{1+s}{c} & 0 \\ 0 & \frac{1-s}{c} \end{pmatrix},$$

where $c^2=1-s^2$.

Although the scaling procedure 800 shown in FIG. 8 has one fewer lifting step than the one in FIG. 9, the latter procedure 900 has only three non-trivial lifting steps as opposed to four in the former. For the reason stated in the above paragraph, the first or last trivial lifting step in FIG. 9 may be merged with prior or subsequent transform steps (for instance, with the Hadamard network 710 at either end of FIG. 7) under certain conditions (for instance when U1, U2 and V1 are identities).

Figure 10:
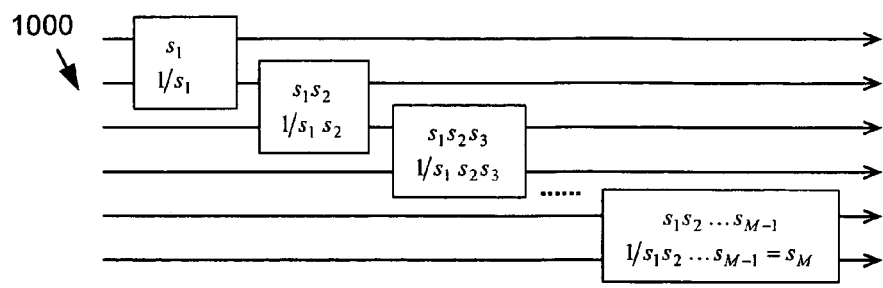
FIG. 10 is a signal flow graph of a cascade of 2-point scaling applied to a larger dimension matrix to realize lossless unit determinant scaling.

The scaling procedure can be easily extended to larger matrices. This is illustrated in FIG. 10, where M possibly different scale factors $s_1$ through $s_M$ are applied to the M data paths as a cascade 1000 of scaling transforms. In order to achieve this in a reversible manner, M−1 reversible scaling transforms are needed in general.

One useful special case is when the M scale factors $s_1$ through $s_M$ can be grouped into M/2 groups of form (s, 1/s). In this case, only M/2 reversible scaling transforms are needed. One example is $s_1=s_2= \ldots =s_{M/2}=s$ and $S_{M/2+1}= s_{M/2+2}= \ldots =s_M=1/s$. A preferred way of grouping is to maintain symmetry across the central axis, in other words each group scales the coefficients $s_i$ and $s_{M+1-i}$. If M is odd, the one scale factor not grouped is 1, corresponding to the data path along the axis.

On signal boundaries where pre/post filters need to extend outside of the signal, one solution is to extend the signal symmetrically and then apply pre/post filters. This is not a lossless operation in general because of the scaling. Another solution is to skip pre/post filtering on boundaries. There is no notable difference between the two solutions in terms of R-D performance as well as perceptual quality (for instance, if used for lossy image/video compression).

Figure 11:
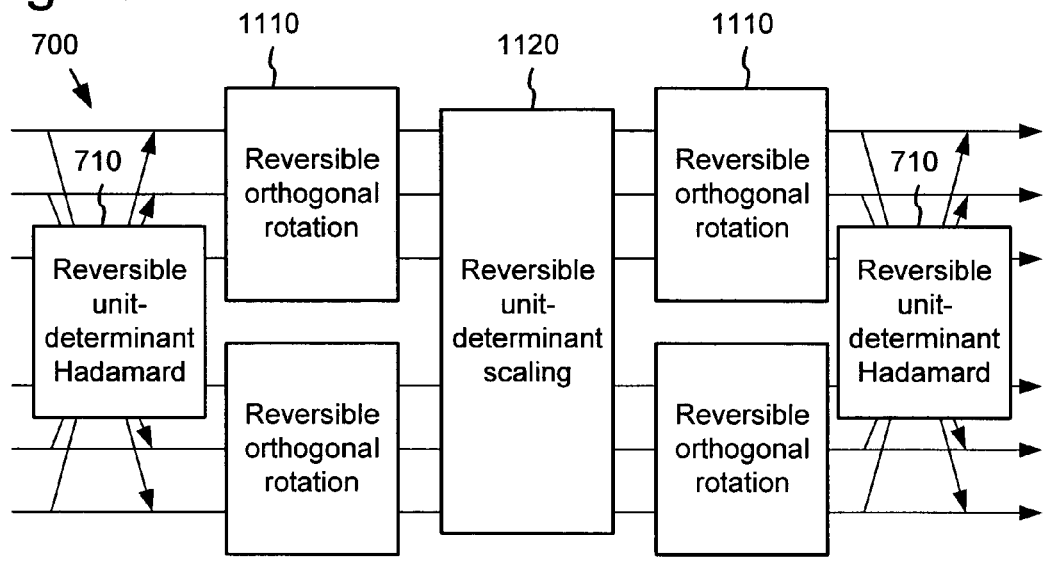
FIG. 11 is a signal flow graph of a reversible overlap operator (or pre-/post-filter) having the structure shown in FIG. 7 and using the lossless unit determinant scaling of FIG. 10.

Turning now to FIG. 11, the reversible overlap operator having the desired R-D efficient (i.e., unit determinant) property is then realized as a linear phase pre-filter structure 700 (FIG. 7) that includes reversible, unit-determinant Hadamard networks 710, reversible orthogonal rotations 1110 (for component matrices U1, U2, V1 and V2), and reversible unit-determinant scaling 1120 (e.g., using the lifting step procedures 800, 900 or cascade 1100). The post filter is analogous to the pre filter and is built using the same construction, albeit with inverse lifting steps in the reverse order. This is illustrated in FIG. 7, where the number of data values M in the block is in general any natural number. Although the illustration is for even valued M, odd values are also possible by noting that the "1 point Hadamard" transform of the center data value is itself. This procedure can be generalized to higher dimensional data.

Figure 12:
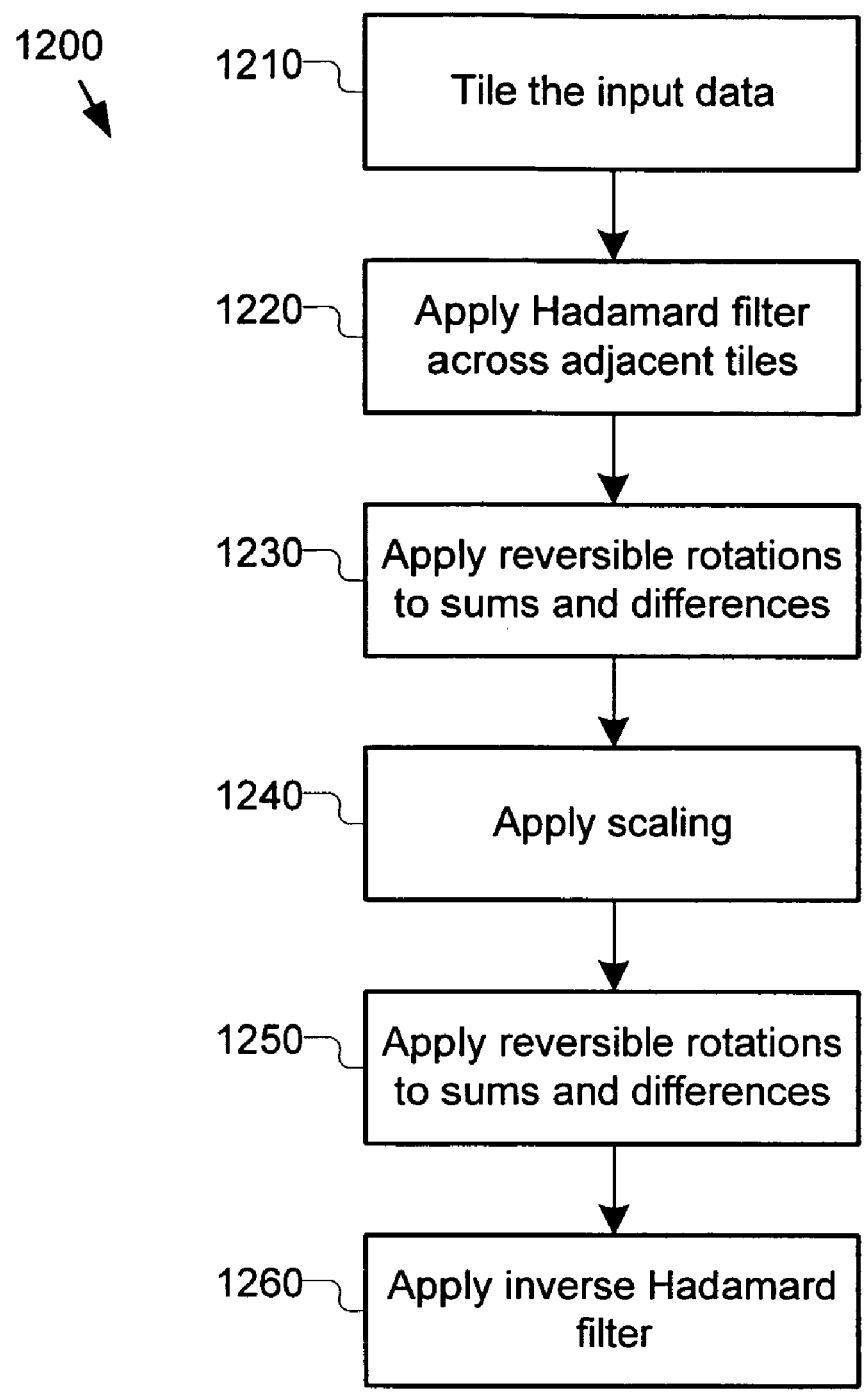
FIG. 12 is a flow chart of the operation of the reversible overlap operator of FIG. 11.

In summary, the operation of the reversible overlap operator is illustrated in FIG. 12. In a first step 1210, the input 2-dimensional digital media data is tiled into blocks (as also shown for the encoder 400 in FIG. 4). The reversible overlap operator applies a Hadamard network 710 across adjacent tiles at step 1220. The operator then applies reversible rotations to sums and differences at step 1230, followed by the reversible scaling operator at step 1240. This is followed by another reversible block rotation (step 1250), and reversible inverse Hadamard network (step 1260).

Figure 13:
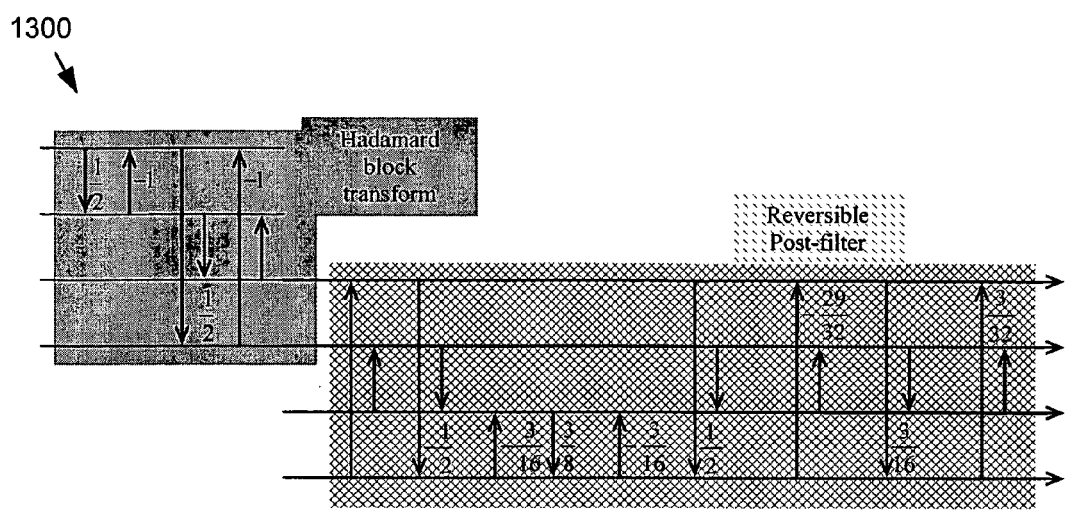
FIG. 13 is a signal flow graph illustrating an example of a reversible lapped transform implementation using the reversible overlap operator of FIG. 11.

With reference now to FIG. 13, the matrix representations of the reversible block rotations and scaling operators depend upon the desired lapped operator using for instance the arithmetic described in equation (1). FIG. 13 shows an example of a post-filter having the structure 700 shown in FIGS. 7 and 11, which is preceded by a reversible block transform (4 point Hadamard transform in this case). The transfer function of the post-filter is:

$$T = \begin{pmatrix} 0.9885 & 0.1553 & -0.1553 & 0.2183 \\ -0.1499 & 0.9885 & 0.2183 & 0.1499 \\ 0.1502 & 0.2167 & 0.9884 & -0.1502 \\ 0.2167 & 0.1556 & 0.1556 & 0.9884 \end{pmatrix} \quad (6)$$

Figure 14:
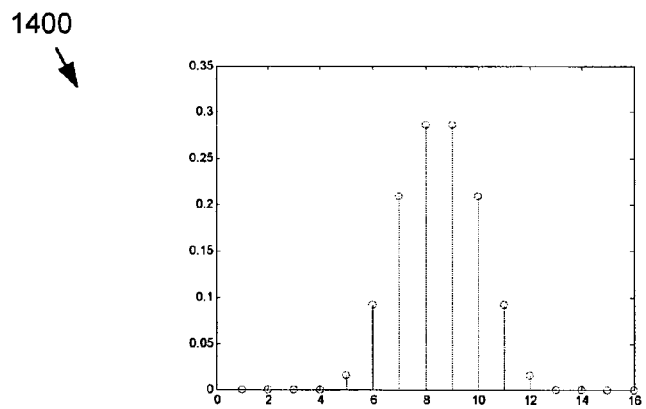
FIG. 14 is an impulse response graph of the DC coefficient of the example lapped transform of FIG. 13.

The low pass component of the Hadamard produces the impulse response shown in the graph in FIG. 14.

4. Overlap Transform Modes

In one exemplary implementation, the encoder 400 and decoder 500 support multiple compression modes, using different types of transform (e.g., the lapped transform described herein, as well as a mode where the overlap filtering is omitted). During the process of encoding, an internal parameter OverlapMode is supplied by the user. This parameter determines the type of transform used for encoding, and is signaled via the bitstream to the decoder. In the exemplary implementation, three choices of Overlap-Mode are allowed—"OL_NONE", "OL_ONE" and "OL_TWO", and work as follows:

1. OL_NONE signals that a block transform is used for compressing the image.
2. OL_ONE signals that a lapped transform is used for the highpass (detail) image, and a block transform is used for the lowpass (DC) image component.

3. OL_TWO signals that a lapped transform is used for both the highpass and lowpass components of the image.

In other encoder/decoder implementations, fewer or additional transform modes can be supported.

Figure 17:
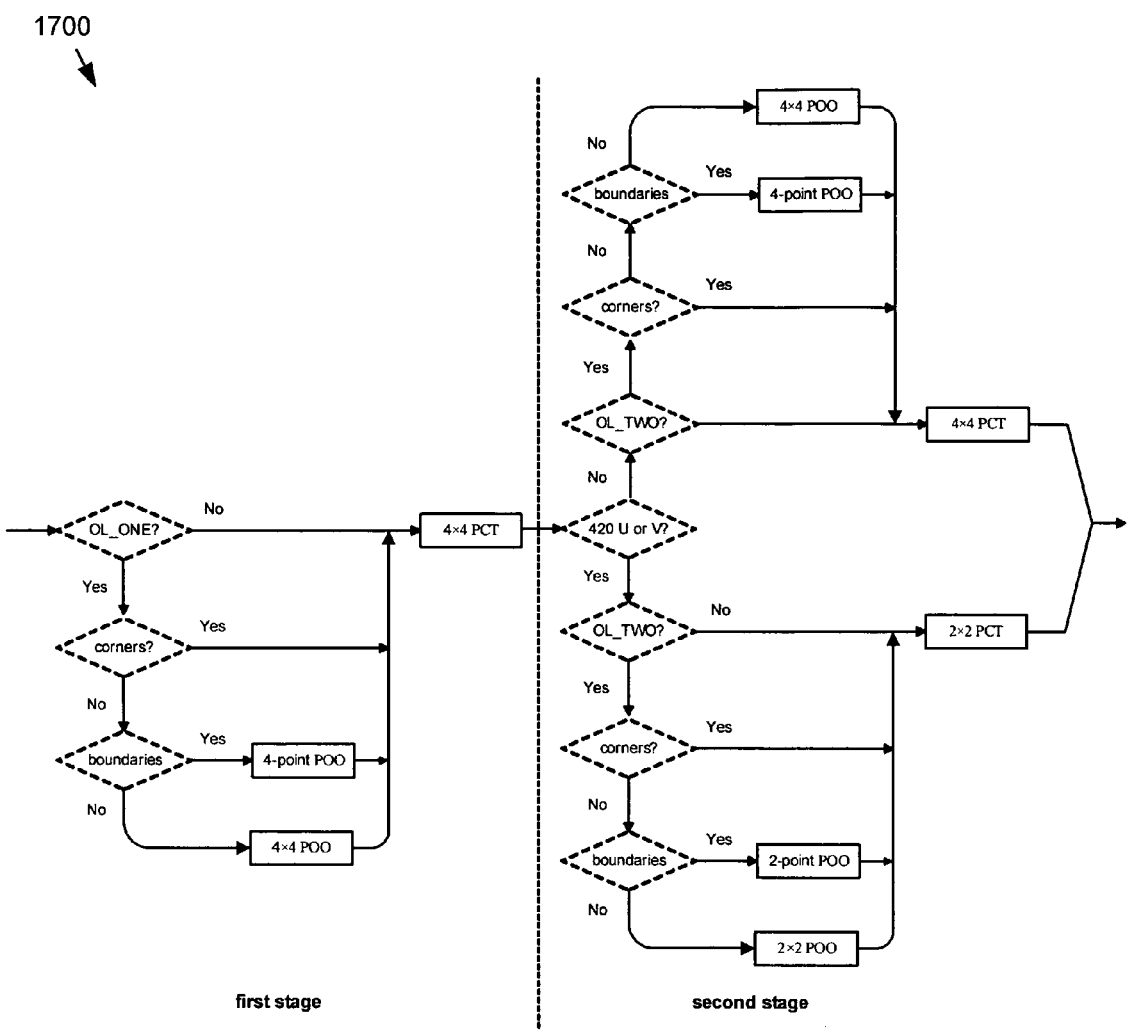
FIG. 17 is a flow chart of the transform applied on the encoder-side by the encoder of FIG. 4.
Figure 18:
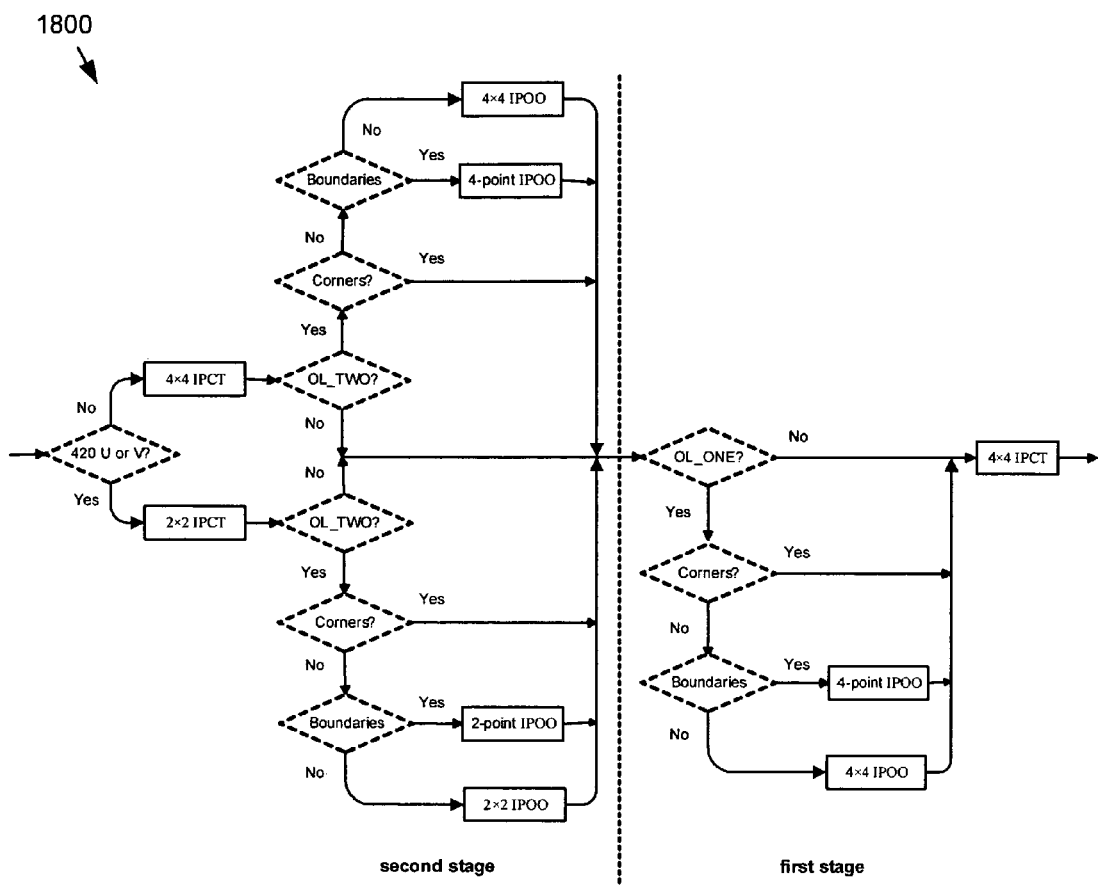
FIG. 18 is a flow chart of the transform applied on the decoder-side by the decoder of FIG. 5.

In the exemplary implementation, the lapped transform is implemented as a 4×4 pre-filter (forward overlap 440) followed by a 4×4 block transform 450 on the encoder side, as shown in FIG. 17 and described more fully below. On the decoder side, the lapped transform is implemented by a 4×4 inverse block transform 550 followed by a 4×4 post filter (inverse overlap 560), as shown in FIG. 18 and described more fully below. When only a block transform is used (for instance, the OL_NONE mode, and for the lowpass bands of a OL_ONE mode compressed image), the pre and post filtering steps are omitted.

For the special case of luminance lowpass color planes in the YUV4:2:0 format, the filter and transform block sizes are 2×2. The following descriptions uses the term "4×4" to refer to the filter/transform size, with the understanding that 2×2 blocks will be used for this special case.

Figure 15:
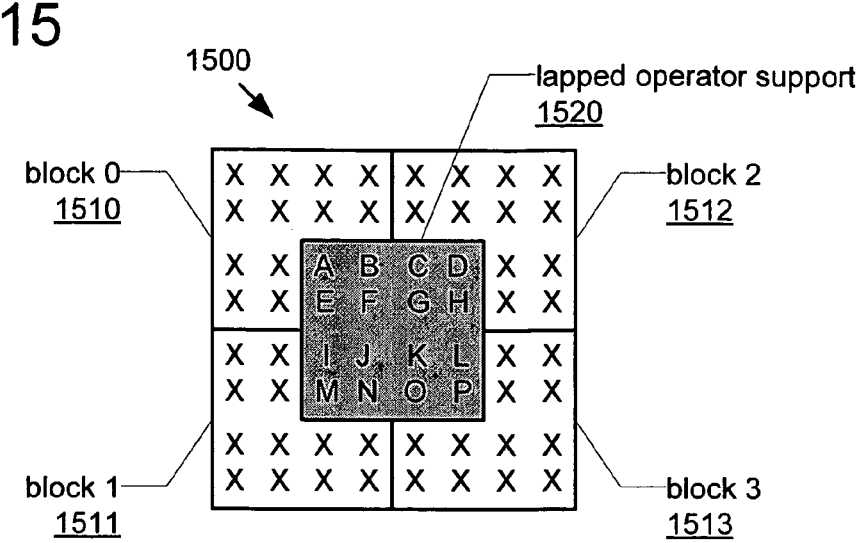
FIG. 15 is a diagram illustrating pixels used as support of a 2-dimensional overlap operator for 4×4 size blocks.
Figure 16:
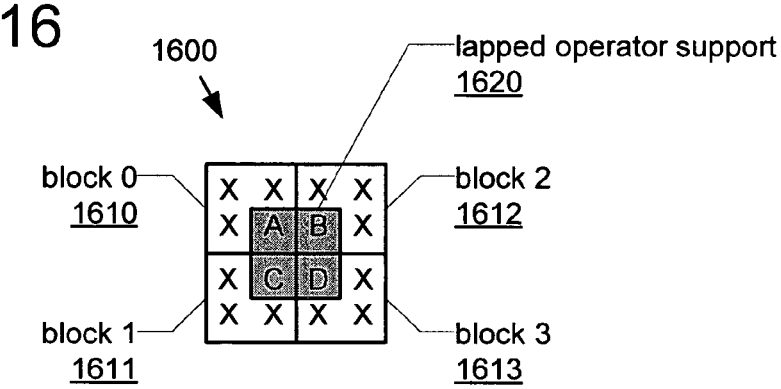
FIG. 16 is a diagram illustrating pixels used as support of a 2-dimensional overlap operator for 2×2 size blocks.

As shown in FIG. 15, the block transform in this exemplary encoder implementation is performed on the natural 4×4 grid, i.e., the array of pixels in 4×4 tiles aligned with the macroblock borders. The filtering process is performed on a staggered 4×4 grid, i.e., the array of pixels in 4×4 tiles offset by 2 in both the horizontal and vertical directions from the macroblock borders. In the diagram 1500 of FIG. 15, the four blocks 1510-1513 indicated correspond to the natural grid for the transform, and the shaded (grey) block 1520 in the center is the region over which the pre/post filter is applied. The pixels in the center block are referred to as the "support" for the overlap operator. FIG. 16 illustrates the alignment 1600 of the transform and overlap operator for the 2×2 special case.

The block transform used in the exemplary implementation and applied to each of the 4×4 blocks is referred to herein as the "core" transform. This core transform implements a reversible approximate 4×4 DCT described by Srinivasan, U.S. patent application Ser. No. 11/015,707, entitled "Reversible Transform For Lossy And Lossless 2-D Data Compression," filed Dec. 17, 2004 (the disclosure of which is hereby incorporated by reference), and also discussed below in the section entitled "Core Transform." After the core transform, a block is mapped into a coefficient block of 1 DC coefficient 460 and 15 AC coefficients 462 (as illustrated in FIG. 4).

The pre/post filter (forward overlap 440 of FIG. 4, and inverse overlap 560 of FIG. 5) in combination with the core transform together implement a lapped transform, also referred to herein as the lapped operator.

After the core transform 450 is applied by the encoder 400 (FIG. 4), the DC coefficients 460 of all blocks of a picture are collected to form a DC subband. A second stage of the core transform is applied to this DC subband. If OverlapMode=OL_TWO, a second stage overlap operator also is applied right before the second stage core transform. If the picture is a Y component, or a U or V component of a YUV_444 image, the DC subband 460 is tiled into 4×4 blocks, and the same 4×4 PCT and 4×4 PLO as the first stage are used. However, if the picture is a U or V component of a YUV 4:2:0 image, the DC subband is tiled into 2×2 blocks instead. Accordingly, 2×2 PCT and 2×2 PLO are used. FIG. 16 illustrates the 2×2 support 1620 for the 2×2 lapped operator, which also spans 2×2 adjacent blocks 1610-1613.

With reference to FIG. 15, on the corners of a picture, only 1 of the 4 blocks that the lapped operator spans is available. These are, block 3 for top left corner, block 1 for top right, block 2 for bottom left, and block 0 for bottom right. In these cases, the 4×4 or 2×2 lapped operator is skipped.

On picture boundaries other than the 4 corners, 2 of the 4 blocks that the lapped operator 1520 spans are available. In these areas, only a one dimensional operator is required. Therefore, the 4×4 lapped operator is replaced by two instances of a 1D 4-point lapped operator (and likewise for the 2×2 lapped operator).

Specifically, there are 4 cases (with reference to FIG. 15):
the support 1520, 1620 spans the top picture boundary (blocks 0 & 2 are not available and blocks 1 & 3 are available): the 4-point lapped operator is applied to points (i, j, k, l) and to points (m, n, o, p), or the 2-point lapped operator is applied to points (c, d);
the support 1520, 1620 spans the bottom picture boundary (blocks 1 & 3 are not available and 0 & 2 are available): the 4-point lapped operator is applied to points (a, b, c, d) and to points (e, f, g, h), or the 2-point lapped operator is applied to points (a, b);
the support 1520, 1620 spans the left picture boundary (blocks 0 & 1 are not available and 2 & 3 are available): the 4-point lapped operator is applied to points (c, g, k, o) and to points (d, h, l, p), or the 2-point lapped operator is applied to points (b, d);
the support 1520, 1620 spans the right picture boundary (blocks 2 & 3 are not available and 0 & 1 are available): the 4-point lapped operator is applied to points (a, e, i, m) and to points (b, f, j, n), or the 2-point lapped operator is applied to points (a, c).

Accordingly, the lapped transform utilized in the encoding process 1700 (FIG. 17) of the exemplary implementation of the encoder 400 (FIG. 4) involves a 2×2 core transform, a 4×4 core transform, a 2×2 lapped operator, a 4×4 lapped operator, a 2-point lapped operator, and a 4-point lapped operator. The decoding process 1800 (FIG. 18) utilized by the decoder 500 (FIG. 5) reverses the process losslessly. The inverse core transform is the perfect inverse of the encoder's core transform, and the inverse lapped operator is the perfect inverse of the encoder's lapped operator. The one-dimensional 4-point lapped operator is described in the above section, entitled, "Reversible Overlap Operator." The two-dimensional lapped operators are described next.

5. Two-Dimensional Pre/Post-Filtering

Figure 19:
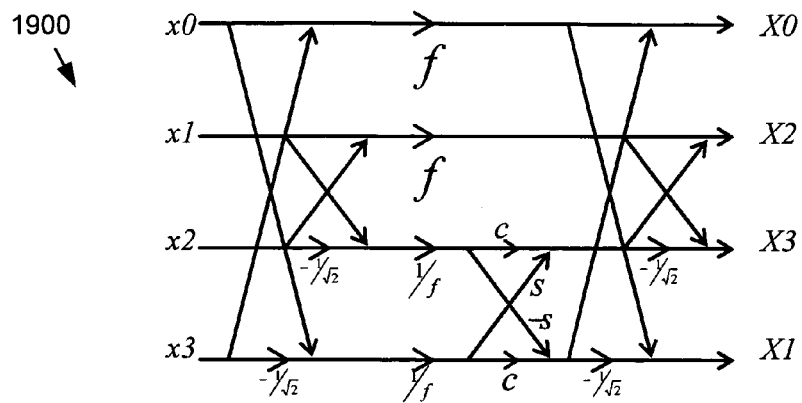
FIG. 19 is a signal flow graph providing a canonical representation of the one-dimensional reversible overlap operator shown in FIG. 11.
Figure 20:
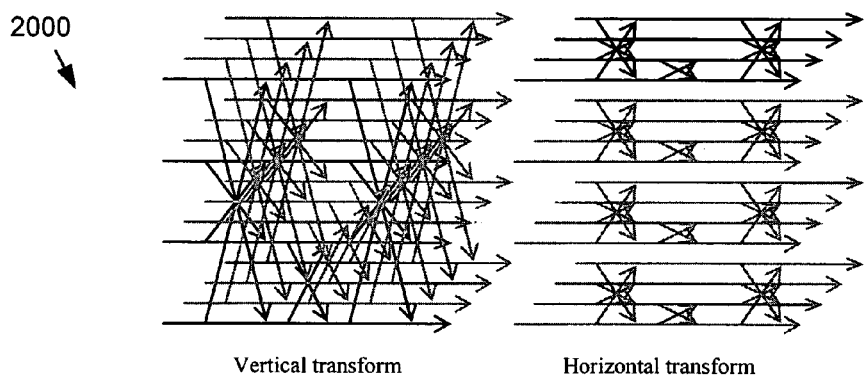
FIG. 20 is a signal flow graph illustrating a two-dimensional pre/post-filter for a lapped transform implemented by separably applying the one-dimensional reversible overlap operator of FIG. 19, horizontally and vertically.

In one approach, a 4×4 lapped operator for the two-dimensional pre/post-filtering 440 (FIG. 4) can be implemented by separably applying the 4-point lapped operator 1900 of FIG. 19 (also described in the section entitled, "Reversible Overlap Operator" above) horizontally and vertically to the 4×4 lapped operator support 1520 (FIG. 15). This separable approach implementation 2000 of the 4×4 lapped operator is illustrated in FIG. 20. More particularly, this approach applies the one-dimensional 4-point lapped operator to the vertical columns of the 4×4 lapped operator support 1520 (i.e., column a,e,i,m; column b,f,j,n; column c,g,k,o; and column d,h,l,p), followed by applying the one-dimensional 4-point lapped operator to the horizontal rows (i.e., row a,b,c,d; row e,f,g,h; row, i,j,k,l; and row m,n,o,p). However, this approach 2000 has several drawbacks, as summarized in the Summary section above.

The exemplary implementation of the encoder 400/decoder 500 described herein uses another approach to implementing the two-dimensional pre/post-filtering (forward overlap 440 and inverse overlap 560) that addresses these drawbacks. This other approach 2100 (FIG. 21) intersperses the operations from the horizontal and vertical filters of the separable approach in multiple stages. Further, the operations are grouped to form 2×2 transforms that have normalized scale-free and reversible "butterfly" realizations, as shown in FIGS. 24, 29 and 30. Moreover, the normalized scaling operation implemented in lifting steps described in the section entitled, "Reversible Overlap Operator," above can be applied to a more limited set of signal pairs by noting the cancellation of "cross terms" in the interspersed two-dimensional structure. This results in an efficient scale-free reversible 2-dimensional pre/post filter, which in conjunction with an efficient scale-free reversible 2-dimensional block transform provides a lapped transform that may be used in the encoder/decoder for effective and computationally efficient compression of images and video, both lossless and lossy.

Figure 21:
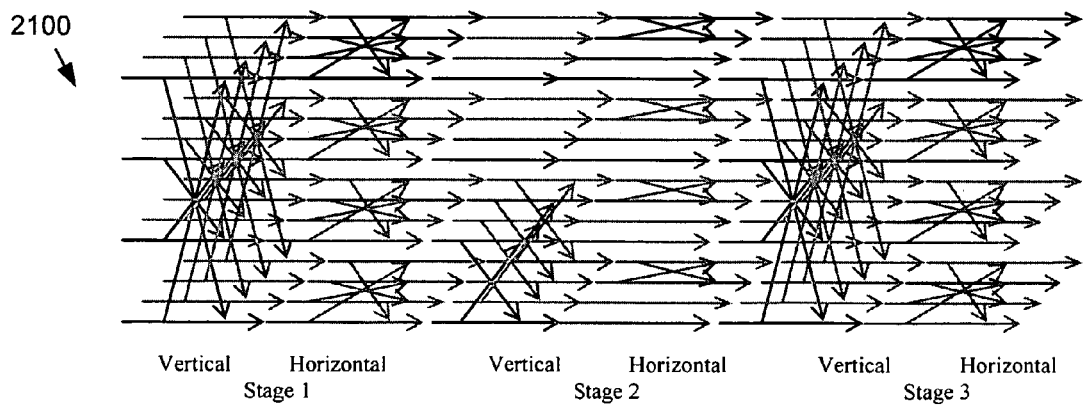
FIG. 21 is a signal flow graph illustrating a two-dimensional pre/post-filter for a lapped transform implemented by interleaving horizontal and vertical operations of the two-dimensional filter in stages.

As illustrated in FIG. 21, this second approach in one illustrated implementation intersperses the vertical and horizontal operations of the pre/post filters into three stages. Within each stage, the operations are further re-arranged into basic 2×2 operations on separate groups of 4 points of the 4×4 data block.

More specifically, the first stage in the pre/post filters, as well as the last stage, is realized as a normalized 2 point Hadamard butterfly. The vertical and horizontal operations in this stage are re-arranged into a 2×2 normalized Hadamard operation (which is the $J_H$ transform described in the previously referenced Srinivasan, U.S. patent application Ser. No. 11/015,707, entitled "Reversible Transform For Lossy And Lossless 2-D Data Compression," filed on Dec. 17, 2004) as defined in the program listing 2200 shown in FIG. 22, which is applied separately to groups of 4-points in the 4×4 data block. This 2×2 normalized Hadamard operation is applied to a 2×2 input matrix 2300 (points a, b, c and d) as shown in FIG. 23. Shading is used in FIG. 23 and the remainder of this document to represent correspondences between data points (equivalently pixels or matrix elements) and the processing steps. The basic 2×2 operation applied to the input matrix [a b;c d] is computed in-place as shown in FIG. 23.

The Stage 1 and Stage 3 operations in the interspersed approach 2100 (FIG. 21) can then be re-arranged into applications of this 2×2 normalized Hadamard operation 2200 (FIG. 22) to four separate 4-point groups 2400 (FIG. 24) in the data block, i.e., the 4-points at the corners 2410, the center 4-points 2420, the top/bottom edge 4-points 2430, and the 4-points at the left/right edges 2440.

On the other hand, the Stage 2 operations comprise two steps—the first is rotation (represented in FIG. 21) and the second is scaling (not shown in FIG. 21). The order of these two steps is not critical, although the same ordering must be maintained by all codecs for consistency, and their order in the lapped transform relative to the inverse lapped transform is in reverse.

The rotation step is implemented by again re-arranging the operations into separate 2×2 transforms. Since the low-pass terms are pass-through for the one-dimensional case (points x0 and x1 in the 4-point lapped operator 1900 of FIG. 19), the low-low points (i.e. lowpass in both directions) in two-dimensions are again pass-through (i.e., not filtered at this stage). This corresponds to the upper left 2×2 sub-block 2910 in FIG. 29.

The high-high terms 2920 (FIG. 29) are implemented with an efficient 2×2 normalized reversible rotation operation 2500, which is the $J_{odd-odd}$ transform described in the previously referenced Srinivasan, U.S. patent application Ser. No. 11/015,707, entitled "Reversible Transform For Lossy And Lossless 2-D Data Compression," filed on Dec. 17, 2004. This $J_{odd-odd}$ transform can be implemented in the C programming language listing 2500 shown in FIG. 25. The offsets in the nontrivial lifting steps (i.e. those involving multiply by 3) are chosen so as to minimize overall bias. The inverse of this transform for the post-filter can be implemented in the C programming language listing 2600 shown in FIG. 26. The high-low and low-high terms 2930 (FIG. 29) involve only one dimensional filtering since the other dimension operation is a pass-through. These are implemented with two-point rotations as defined in the C-programming language listing 2700 shown in FIG. 27. The inverse operation for the post-filter is implemented in the C-programming language listing 2800 in FIG. 28. These two-point rotations are simple approximations involving 2 computationally trivial lifting steps, which work well in practice. Other approximations alternatively may be used. This 2-point rotation is applied as four sets of 2-point operations to the high-low and low-high terms 2930, as indicated by the shading in FIG. 29.

As for the scaling step of Stage 2, the one-dimensional 4-point lapped operator 1900 (FIG. 19) includes scaling the four points by [f f 1/f 1/f]. For the 2-dimensional case, the scaling step realizes the outer product of [f f 1/f 1/f] with itself. The resulting scaling matrix is $$\begin{bmatrix} f^2 & f^2 & 1 & 1 \\ f^2 & f^2 & 1 & 1 \\ 1 & 1 & f^{-2} & f^{-2} \\ 1 & 1 & f^{-2} & f^{-2} \end{bmatrix}.$$

Half the matrix entries are unity, and therefore these points are merely passed through. The remaining entries are paired symmetrically in two-point operations around the center of the matrix (i.e., pairs 3010, 3020, 3030 and 3040, as shown in the shading in FIG. 30. Symmetry is necessary for best rate-distortion performance to match with Stages 1 and 3 of the interspersed approach 2100 (FIG. 21). The 2-point scaling operation applied to each pair is itself implemented in the C-programming language listing 3100 shown in FIG. 31. The inverse 2-point scaling operation for the post-filter is shown in the listing 3200 of FIG. 32. Alternatively, other approximations are also possible for the two point scaling process. Moreover, the scaling process may be combined with the 2×2 Hadamard operations of either Stage 1 or Stage 3 noting the cancellations between their end operations.

FIG. 33 shows a program listing 3300 of the complete 4×4 lapped operator using the interspersed approach 2100 shown in FIG. 21. As discussed above for the exemplary implementation of the encoder 400/decoder 500 shown in FIGS. 17 and 18, the 4×4 lapped operator is applied to the non-corner and non-boundary part of a picture if OL_ONE is true. If OL_TWO is true, it also is applied to the non-corner and non-boundary part of the DC subband of a picture if it is not a U or V component of a YUV 4:2:0 image. Other alternative realizations, with different approximations or merged steps (especially between scaling and Hadamard) are possible.

As illustrated in FIG. 15 above, the 4×4 lapped operator is applied to the lapped operator support, which can be represented as input data block $$\begin{bmatrix} a & b & c & d \\ e & f & g & h \\ i & j & k & l \\ m & n & o & p \end{bmatrix}.$$

The 4×4 forward lapped operator is then defined in this program listing as the function, PLO4×4 (a, b, c, d, e, f, g, h, i, j, 1, 1, m, n, o, p). As discussed above, this function includes applying the 2×2 Hadamard operation 2200 (FIG. 22), forward scaling 3100 (FIG. 31), 2-point rotations 2700 (FIG. 27), and the forward odd-odd transform 2500 (FIG. 25) in three stages to the sub-groups of the points of the input block shown in FIGS. 24, 29 and 30.

FIG. 34 shows a program listing 3400 of an implementation of the inverse 4×4 lapped operator also using the interspersed approach. Where the input coefficient block of the inverse 4×4 lapped operator is the block $$\begin{bmatrix} a & b & c & d \\ e & f & g & h \\ i & j & k & l \\ m & n & o & p \end{bmatrix},$$

then the operator is defined in this program listing as the function IPLO4×4 (a, b, c, d, e, f, g, h, i, j, 1, 1, m, n, o, p). The inverse 4×4 lapped operator includes applying the 2×2 Hadamard operation 2200 (FIG. 22) (which is its own inverse), the inverse odd-odd transform 2600 (FIG. 26), the inverse 2-point rotation 2800 (FIG. 28), and the inverse scaling 3200 (FIG. 32), again in three stages to the sub-groups of points of the coefficient block as shown in FIGS. 24, 29 and 30.

As a special case discussed above, the exemplary implementation of the encoder/decoder shown in FIGS. 17 and 18 also applies a 2×2 pre/post-filtering operation. FIG. 35 shows a program listing 3500 for the 2×2 pre-filtering. The 2×2 pre/post-filtering is similar to the 4×4 pre/post-filtering, except there is no rotation in Stage 2. The 2×2 pre-filtering therefore can be realized as for the 4×4 case described above with the Stage 2 rotation steps eliminated. FIG. 36 shows a program listing 3600 implementing the 2×2 post-filtering.

In the exemplary implementation of the encoder/decoder shown in FIGS. 17 and 18, filtering along one dimension also is necessary along image edges where there are insufficient pixels for a 2D filtering step. The 1D filters may be more complicated than corresponding 2D filters due to the lack of shortcuts for normalized lossless lifting realizations. Implementation of 1D pre/post filtering is discussed in the section entitled, "Reversible Overlap Operator," above.

FIG. 37 shows the program listing 3700 (in the C-programming language) of the 1-dimensional 2-point lapped operator, which is applied in the exemplary implementation of the encoder/decoder of FIGS. 17 and 18 to boundaries of the DC sub-bands of the U and V components of a YUV 4:2:0 image if OL_TWO is true. FIG. 38 shows the program listing 3800 for the one-dimensional inverse 2-point lapped operator.

The exemplary implementation of the encoder/decoder of FIGS. 17 and 18 also applies a 4-point lapped operator to boundaries of a picture if OL_ONE is true. If OL_TWO is true, the 4-point lapped operator also is applied to boundaries of the DC subband of a picture if it is not a U or V component of a YUV 4:2:0 image. The 1-dimensional 4-point forward lapped operator for input data ordered as [a b c d] is then defined in the program listing 3900 (in C-programming language) shown in FIG. 39 as the function, PLO4 (a, b, c, d). The program listing 4000 shown in FIG. 40 includes the function, IPLO (a, b, c, d) that defines the 4-point inverse lapped operator on the input coefficients [a b c d].

6. Core Transform

As remarked above, the exemplary implementation of the encoder/decoder implements a lapped transform, which is a combination of the above described overlap operators together with a reversible approximate 4×4 DCT described by the above-referenced Srinivasan, U.S. patent application Ser. No. 11/015,707, entitled "Reversible Transform For Lossy And Lossless 2-D Data Compression," filed Dec. 17, 2004. As indicated in FIG. 17 for the encoding process 1700 and in FIG. 18 for the decoding process 1800 of this exemplary implementation, the encoder/decoder uses a 2×2 core transform, 2×2 inverse core transform, 4×4 core transform and 4×4 inverse core transform. Implementations of these transforms are defined in the program listings (in the C-programming language) shown in FIGS. 41-46, and discussed below.

The 2×2 forward core transform on a 2×2 input block $$\begin{bmatrix} a & b \\ c & d \end{bmatrix}$$

can be implemented in 2 steps:
1. apply the Hadamard2×2(a, b, c, d) function 2200 of FIG. 22;
2. swap points b and c.

In some implementations, step 2 can be combined with quantization or zigzag scanning.

The 2×2 inverse core transform on a 2×2 coefficient block $$\begin{bmatrix} a & b \\ c & d \end{bmatrix}$$

can be implemented in 2 steps:
1. swap points b and c;
2. apply the Hadamard2×2(a, b, c, d) function 2200 (FIG. 22).

In some implementations, step 1 can be combined with dequantization or inverse zigzag scanning.

The 4×4 forward core transform applied on a 4×4 input data block $$\begin{bmatrix} a & b & c & d \\ e & f & g & h \\ i & j & k & l \\ m & n & o & p \end{bmatrix}$$

can be implemented in 2 steps:
1. apply the function 4100, PCT4×4(a, b, c, d, e, f, g, h, I, j, k, l, m, n, o, p), shown in FIG. 41. Similar to the 4×4 lapped operator, this function uses an interspersed approach, in which the operations are further arranged into 2×2 operations on sub-groups of points of the data block. These 2×2 operations includes the odd transform implemented in the function 4200 shown in FIG. 42, and the odd-odd transform implemented in the function 4300 shown in FIG. 43. Other approximations based on more or fewer lifting steps to implement the rotations are possible.

2. Reshuffle the data block from $$\begin{bmatrix} a & i & g & e \\ c & k & m & o \\ j & d & p & n \\ b & l & h & f \end{bmatrix} \text{ to } \begin{bmatrix} a & b & c & d \\ e & f & g & h \\ i & j & k & l \\ m & n & o & p \end{bmatrix}.$$

This can be combined with quantization/zigzag scanning.

The 4×4 inverse core transform on the 4×4 input coefficient block $$\begin{bmatrix} a & b & c & d \\ e & f & g & h \\ i & j & k & l \\ m & n & o & p \end{bmatrix}$$

can be implemented in the following 2 steps:
1. Reshuffle the coefficient block from $$\begin{bmatrix} a & b & c & d \\ e & f & g & h \\ i & j & k & l \\ m & n & o & p \end{bmatrix} \text{ to } \begin{bmatrix} a & i & g & e \\ c & k & m & o \\ j & d & p & n \\ b & l & h & f \end{bmatrix}.$$

This can be combined with dequantization/inverse zigzag scanning.

2. Apply the function 4400, IPCT4×4(a, b, c, d, e, f, g, h, I, j, k, l, m, n, o, p) shown in FIG. 44, which is the inverse of the function 4100, PCT4×4. The function 4400 includes the 2×2 transforms: the inverse odd transform implemented by the function 4500 shown in FIG. 45, and the inverse odd-odd transform defined by the function 4600 shown in FIG. 46.

7. Computing Environment

The above described codec based on a lapped transform using a 4×4 pre/post filtering can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 47.

Figures 46, 47:
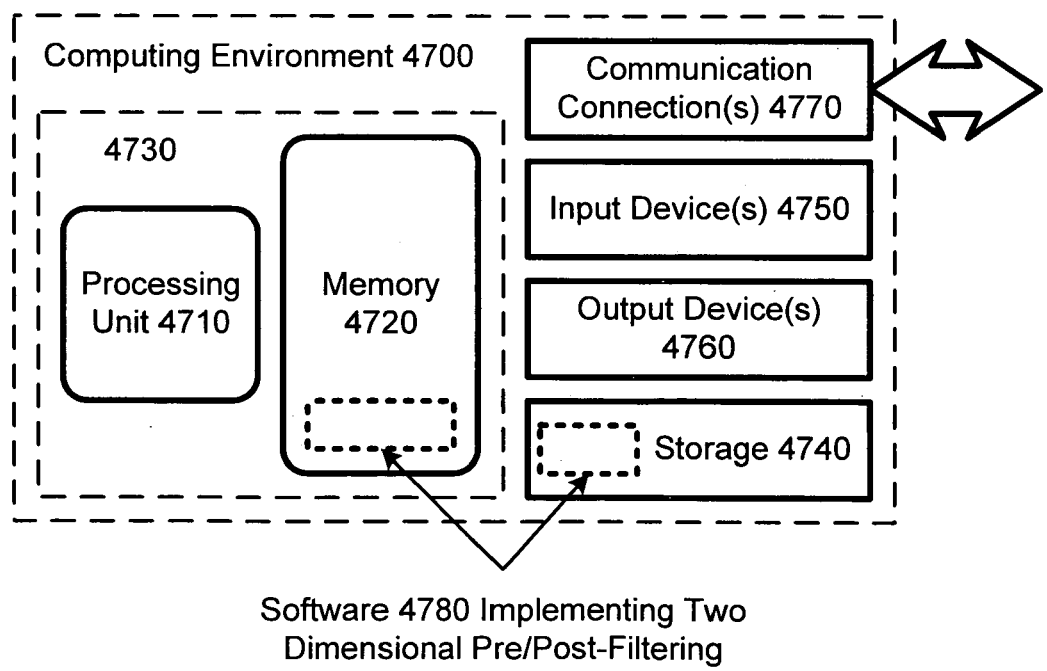
FIG. 46 is a program listing in the C programming language for realizing another transform that forms part of the inverse transform of FIG. 44.
FIG. 47 is a block diagram of a suitable computing environment for implementing the block transform-based codec with improved spatial-domain lapped transform of FIGS. 4 and 5.

FIG. 47 illustrates a generalized example of a suitable computing environment (4700) in which described embodiments may be implemented. The computing environment (4700) is not intended to suggest any limitation as to scope of use or functionality of the invention, as the present invention may be implemented in diverse general-purpose or special-purpose computing environments.

With reference to FIG. 47, the computing environment (4700) includes at least one processing unit (4710) and memory (4720). In FIG. 47, this most basic configuration (4730) is included within a dashed line. The processing unit (4710) executes computer-executable instructions and may be a real or a virtual processor. In a multi-processing system, multiple processing units execute computer-executable instructions to increase processing power. The memory (4720) may be volatile memory (e.g., registers, cache, RAM), non-volatile memory (e.g., ROM, EEPROM, flash memory, etc.), or some combination of the two. The memory (4720) stores software (4780) implementing the described encoder/decoder and transforms.

A computing environment may have additional features. For example, the computing environment (4700) includes storage (4740), one or more input devices (4750), one or more output devices (4760), and one or more communication connections (4770). An interconnection mechanism (not shown) such as a bus, controller, or network interconnects the components of the computing environment (4700). Typically, operating system software (not shown) provides an operating environment for other software executing in the computing environment (4700), and coordinates activities of the components of the computing environment (4700).

The storage (4740) may be removable or non-removable, and includes magnetic disks, magnetic tapes or cassettes, CD-ROMs, CD-RWs, DVDs, or any other medium which can be used to store information and which can be accessed within the computing environment (4700). The storage (4740) stores instructions for the software (4780) implementing the codec based on a lapped transform using the 4×4 pre/post-filtering.

The input device(s) (4750) may be a touch input device such as a keyboard, mouse, pen, or trackball, a voice input device, a scanning device, or another device that provides input to the computing environment (4700). For audio, the input device(s) (4750) may be a sound card or similar device that accepts audio input in analog or digital form, or a CD-ROM reader that provides audio samples to the computing environment. The output device(s) (4760) may be a display, printer, speaker, CD-writer, or another device that provides output from the computing environment (4700).

The communication connection(s) (4770) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (4700), computer-readable media include memory (4720), storage (4740), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

4. Variations and Extensions of the Reversible Overlap Operator

Various modifications and extensions of the above described reversible overlap operator can be made. Although the descriptions presented above are for one dimensional data, the same procedure may be applied separably, or non-separably to multiple data dimensions.

The orthogonal rotations in the above described reversible overlap operator implementation be replaced by approximations thereof, or by other transforms which may not be orthogonal.

Furthermore, although the primary focus in the above description has been on the lossless recovery of input data, the same transform may be used for lossy data compression as well. In this case, the loss may occur either in the quantization process, or due to a limited precision/approximate implementation of either pre filter or post filter, or due to other inaccuracies, or a combination of multiple factors.

The reversible overlap operator described here may be applied to domains outside of data-compression. The lapped transform using the reversible overlap operator may itself be expansive.

The reversible overlap operator may be applied, in appropriately modified form, to implement multirate filter banks, wavelets, lapped transforms with support spanning more than 2 block widths (K>2 N).

The reversible overlap operator may be applied in a spatially varying manner, in which the extent and shape of overlap filter may vary across the spatial extent of the data.

In view of the many possible embodiments to which the principles of our invention may be applied, we claim as our invention all such embodiments as may come within the scope and spirit of the following claims and equivalents thereto.

We claim:

1. A method of processing 2-dimensional digital media data as a lapped transform, the method comprising:
    applying a reversible 2-dimensional overlap operator to a first set of 2-dimensional blocks of the digital media data on a staggered grid basis; and
    applying a reversible 2-dimensional block transform to a second set of 2-dimensional blocks of the digital media data on an aligned grid basis, the staggered grid basis being spatially staggered relative to the aligned grid basis, the applying the reversible 2-dimensional overlap operator and the reversible 2-dimensional block transform together effecting the lapped transform of the 2-dimensional digital media data.

2. A method of encoding and decoding the 2-dimensional digital media data by using, in part, the processing as the lapped transform of claim 1, wherein the steps of applying the reversible 2-dimensional overlap operator and applying the reversible 2-dimensional block transform at decoding are inverted from and in reverse order of the overlap operator and block transform applied at encoding the 2-dimensional digital media data, and wherein the processing as a lapped transform at decoding is a lossless inverse of the processing as a lapped transform at encoding apart from any other processing performed in encoding and decoding the 2-dimensional digital media data.

3. The method of claim 1, wherein the applying the reversible 2-dimensional overlap operator comprises, for a block in the first set of 2-dimensional blocks on the staggered grid basis:
    applying a series of operations in a plurality of stages interleaving those of a horizontally and vertically separable application of a 1-dimensional reversible overlap operator to the block, the operations in a respective stage being arranged as a set of elementary transforms implemented as lifting steps to independent sub-groups of points in the block.

4. The method of claim 3, wherein the applying operations in an initial and last stage comprises applying a normalized 2×2 Hadamard operator to 4-point subsets of the block.

5. The method of claim 4, wherein for the case of 4×4 point size blocks, the 4-point subsets comprise:
    a group of four points at corners of the block;
    a group of four points in a center of the block;
    a group of four points centered at horizontal edges of the block; and
    a group of four points centered at vertical edges of the block.

6. The method of claim 4, wherein the applying operations in a stage between the initial and last stage comprises applying rotation transforms to subsets of points in the block.

7. The method of claim 6, wherein for the case of 4×4 point size blocks, the applying rotation transforms comprises:
    passing through points in a 2×2 low-pass, low-pass subset of the block;
    applying a 2×2 rotation transform to points of a 2×2 high-pass, high-pass subset of the block; and
    applying a 2-point rotation transform to independent 2-point sub-groups of a 2×2 high-pass, low-pass subset and a 2×2 low-pass, high-pass subset of the block.

8. The method of claim 4, wherein the applying operations in another stage between the initial and last stage comprises applying scaling operations to subsets of points in the block.

9. The method of claim 8, wherein the applying scaling operations in the other stage to subsets of point in the block and the applying the 2×2 Hadamard operator in the initial and last stages omit at least some operations relative to horizontally and vertically separable application of the 1-dimensional reversible overlap operator to the block, where such at least some operations are scaling operations of the other stage that mutual cancel with operations of the 2×2 Hadamard operator of the initial and last stages.

10. The method of claim 8, wherein the applying scaling operations in the other stage to subsets of point in the block omits at least some mutually cancelable scaling operations relative to horizontally and vertically separable application of the 1-dimensional reversible overlap operator to the block.

11. The method of claim 8, wherein for the case of 4×4 point size blocks, the applying scaling operations comprises:
    passing through points in a 2×2 high-pass, low-pass subset and a 2×2 low-pass, high-pass subset of the block;

applying scaling operations to a 2×2 high-pass, high-pass subset of the block, and a 2×2 low-pass, low-pass subset of the block.

12. The method of claim 11, wherein the applying scaling operations to the 2×2 high-pass, high-pass subset and the low-pass, low-pass subset of the block comprises:
applying a 2-point scaling operation to pairs of points from the two subsets symmetrically situated about a center of the block.

13. At least one computer-readable medium having a software program carried thereon executable on a digital media processor to cause the processor to perform the method of claim 3 on 2-dimensional digital media data.

14. At least one computer-readable medium having a software program carried thereon executable on a digital media processor to cause the processor to perform the method of claim 8 on 2-dimensional digital media data.

15. A 2-dimensional digital media processor, comprising:
a data storage buffer for storing 2-dimensional digital media data to be processed using a lapped transform;
a processor programmed to:
apply a reversible 2-dimensional overlap operator to a first set of 2-dimensional blocks of the digital media data on a staggered grid basis; and
apply a reversible 2-dimensional block transform to a second set of 2-dimensional blocks of the digital media data on an aligned grid basis, the staggered grid basis being spatially staggered relative to the aligned grid basis, and application of the reversible 2-dimensional overlap operator and the reversible 2-dimensional block transform together effect the lapped transform of the 2-dimensional digital media data.

16. The 2-dimensional digital media processor of claim 15, wherein the processor is further programmed to, when applying the reversible 2-dimensional overlap operator, and for a block in the first set of 2-dimensional blocks on the staggered grid basis:
apply a series of operations in a plurality of stages interleaving those of a horizontally and vertically separable application of a 1-dimensional reversible overlap operator to the block, the operations in a respective stage being arranged as a set of elementary transforms implemented as lifting steps to independent sub-groups of points in the block.

17. The 2-dimensional digital media processor of claim 16, wherein the processor is further programmed to, when applying the series of operations in a plurality of stages,
apply a normalized 2×2 Hadamard operator to 4-point subsets of the block in an initial and last stage;
apply rotation transforms to subsets of points in the block in a stage between the initial and last stage; and
apply scaling operations in the stage between the initial and last stage.

18. The 2-dimensional digital media processor of claim 17, wherein for the case of 4×4 point size blocks of the digital media data, the 4-point subsets comprise:
a group of four points at corners of the block;
a group of four points in a center of the block;
a group of four points centered at horizontal edges of the block; and
a group of four points centered at vertical edges of the block.

19. The 2-dimensional digital media processor of claim 17, wherein for the case of 4×4 point size blocks of the digital media data, the processor is further programmed to, when applying rotation transforms:
pass through points in a 2×2 low-pass, low-pass subset of the block;
apply a 2×2 rotation transform to points of a 2×2 high-pass, high-pass subset of the block; and
apply a 2-point rotation transform to independent 2-point sub-groups of a 2×2 high-pass, low-pass subset and a 2×2 low-pass, high-pass subset of the block.

20. The 2-dimensional digital media processor of claim 17, wherein for the case of 4×4 point size blocks, the processor is further programmed to, when applying the scaling operations:
pass through points in a 2×2 high-pass, low-pass subset and a 2×2 low-pass, high-pass subset of the block;
applying 2-point scaling operations to pairs of points from two subsets symmetrically situated about a center of the block, the two subsets being a 2×2 high-pass, high-pass subset of the block and a 2×2 low-pass, low-pass subset of the block.

* * * * *